(12) United States Patent
Liu et al.

(10) Patent No.: US 12,415,205 B2
(45) Date of Patent: Sep. 16, 2025

(54) ABRASION-RESISTANT, STABLE AND FLAME-RESISTANT SUPERHYDROPHOBIC/SUPEROLEOPHOBIC COATING, AND PREPARATION AND APPLICATION THEREOF

(71) Applicants: QILU UNIVERSITY OF TECHNOLOGY, Jinan (CN); ZHUHAI TAIRAN TECHNOLOGY CO., LTD., Zhuhai (CN)

(72) Inventors: Libin Liu, Jinan (CN); Qing Ban, Jinan (CN); Haihui Jiang, Jinan (CN); XingXiang Ji, Jinan (CN); Furong Tao, Jinan (CN); Ligang Gai, Jinan (CN); Hailong Zhang, Jinan (CN); Xinyu Bu, Jinan (CN)

(73) Assignees: QILU UNIVERSITY OF TECHNOLOGY, Jinan (CN); ZHUHAI TAIRAN TECHNOLOGY CO. LTD., Zhuhai (CN)

( * ) Notice: Subject to any disclaimer, the term of this patent is extended or adjusted under 35 U.S.C. 154(b) by 0 days.

(21) Appl. No.: 17/998,164

(22) PCT Filed: May 20, 2022

(86) PCT No.: PCT/CN2022/094241
§ 371 (c)(1),
(2) Date: Nov. 8, 2022

(87) PCT Pub. No.: WO2022/253012
PCT Pub. Date: Dec. 8, 2022

(65) Prior Publication Data
US 2024/0216949 A1    Jul. 4, 2024

(30) Foreign Application Priority Data
May 31, 2021   (CN) .......................... 202110600595.4

(51) Int. Cl.
*B05D 5/08*     (2006.01)
*B05D 1/02*     (2006.01)
(Continued)

(52) U.S. Cl.
CPC ................. *B05D 5/08* (2013.01); *B05D 1/02* (2013.01); *B05D 3/0272* (2013.01); *B05D 7/24* (2013.01);
(Continued)

(58) Field of Classification Search
CPC .......... B05D 5/08; B05D 1/02; B05D 3/0272; B05D 7/24; C09D 7/61; C09D 7/63
See application file for complete search history.

(56) References Cited

FOREIGN PATENT DOCUMENTS

CN       111019482    *   4/2020

* cited by examiner

*Primary Examiner* — Nathan T Leong
(74) *Attorney, Agent, or Firm* — CBM PATENT CONSULTING, LLC

(57) ABSTRACT

Provided are an abrasion-resistant, stable and flame-resistant superhydrophobic/superoleophobic coating, and a preparation and application thereof, belonging to the field of new materials; the preparation includes: taking a superhydrophobic/superoleophobic suspension as a top-layer spraying solution; dispersing epoxy resin in a solvent, and adding a fluorine-containing curing agent and a flame retardant for reaction to obtain a bottom-layer spraying solution; and first spraying the bottom-layer spraying solution to a surface of a substrate, then spraying the top-layer spraying solution, and drying the surface to obtain a bilayer abrasion-resistant superhydrophobic flame-resistant coating; the superhydrophobic/superoleophobic suspension contains multi-level micro nano structural particles, a fluorine-containing curing agent and fluorinated epoxy resin; the prepared single-layer coating and bilayer structure (BLC) have hydrophobicity, (Continued)

flame resistance, good mechanical properties and excellent corrosion resistance performance.

11 Claims, 17 Drawing Sheets

(51) Int. Cl.
    *B05D 3/02*     (2006.01)
    *B05D 7/24*     (2006.01)
    *C09D 5/18*     (2006.01)
    *C09D 7/61*     (2018.01)
    *C09D 7/63*     (2018.01)
    *C09D 163/00*     (2006.01)
    *C09D 183/06*     (2006.01)

(52) U.S. Cl.
    CPC ................. *C09D 5/18* (2013.01); *C09D 7/61* (2018.01); *C09D 7/63* (2018.01); *C09D 163/00* (2013.01); *C09D 183/06* (2013.01); *B05D 2201/02* (2013.01); *B05D 2203/35* (2013.01); *B05D 2301/30* (2013.01); *B05D 2401/20* (2013.01); *B05D 2504/00* (2013.01); *B05D 2518/10* (2013.01); *B05D 2601/22* (2013.01); *B05D 2602/00* (2013.01)

| CLASSIFICATION OF ADHESION TEST RESULTS |||
|---|---|---|
| CLASSIFICATION | PERCENT AREA REMOVED | SURFACE OF CROSS-CUT FROM WHICH FLAKING HAS OCCURRED FOR SIX PARALLEL CUTS AND ADHESION RANGE BY PERCENT |
| 5B | 0% None | |
| 4B | Less than 5% | |
| 3B | 5-15% | |
| 2B | 15-35% | |
| 1B | 35-65% | |
| 0B | Greater than 65% | |

Fig. 29

ABRASION-RESISTANT, STABLE AND FLAME-RESISTANT SUPERHYDROPHOBIC/SUPEROLEOPHOBIC COATING, AND PREPARATION AND APPLICATION THEREOF

FIELD OF THE INVENTION

The present disclosure belongs to the field of new materials, and relates to a study on surface functional materials, specifically to an abrasion-resistant, stable and flame-resistant superhydrophobic/superoleophobic coating, and a preparation and application thereof.

BACKGROUND OF THE INVENTION

With the advance of industrialization, the requirements for wettable materials in practical industrial applications are higher. People are no longer satisfied with a coating only having good mechanical and chemical stability, and begin to find and prepare multifunctional materials that can be applied to various different fields at the same time. For example, in recent years, flame-resistant materials with a superhydrophobic property have been widely developed, but their single lyophobicity greatly limits their application scope. Therefore, preparing a multifunctional superhydrophobic/superoleophobic flame-resistant coating with a good flame resistance effect is also a way being researched in the coating study field. If it can be achieved, the development of the coating industry can be greatly promoted. However, commonly used flame retardants at the current stage are mainly flame retardants containing polar groups such as phosphorus and nitrogen. The adding of this kind of flame retardants will have a certain impact on the lyophobicity of a coating, which increases the preparation difficulty of superhydrophobic/superoleophobic flame-resistant coatings. Although a hydrophobic and oleophobic fabric is applied to electricity conduction and fire prevention, it is difficult to expand the application of this modification technology to industrial production. In comparison, a spraying technology is more suitable for large-scale promotion than a modification technology. In general, preparing a superhydrophobic/superoleophobic coating which has stable lyophobicity and flame resistance and can also be sprayed to various substrates in a large-scale industrialization manner by using the spraying technology is of great significance in real practical applications of coatings.

Chinese patent application No. CN202010583455.6 discloses a preparation method for a superhydrophobic flame-resistant coating with excellent performance. The preparation steps are as follows: dispersing $SiO_2$ in a mixed solution of anhydrous ethanol and ammonia water, heating the solution after ultrasonic stirring, and adding octadecyl trimethoxysilane to the mixed solution to obtain solution A; dissolving bisphenol A epoxy resin in anhydrous ethanol, and performing ultrasonic stirring to obtain solution B; uniformly mixing solution A with solution B, then quickly adding TEOS, and adding a flame retardant intermediate for continuous stirring to obtain suspension C; and spraying suspension C onto a substrate for curing to obtain a superhydrophobic flame-resistant coating. The superhydrophobic flame-resistant coating with good mechanical and chemical stability is prepared by combining a micro nano structure with epoxy resin. However, the coating has poor chemical and physical stability, low abrasion resistance, poor adhesion to the substrate, low oil resistance, and limited application fields.

Chinese patent application No. 201911348754.5 discloses a preparation and application of a superhydrophobic/oleophobic coating with excellent performance. The preparation includes: dispersing nano particles and cellulose in an alcohol solution containing alkaline substances, adding tetraethyl orthosilicate and fluorine-containing organosilane for hydrolysis coating to form solution A; dispersing epoxy resin in an alcohol solution to form solution B; uniformly mixing solution A with solution B, and then adding tetraethyl orthosilicate and fluorine-containing organic silane for reaction to generate polysiloxane referred to as solution C; dissolving a fluorine-containing amine compound in the alcohol solution, which is referred to as solution D; and uniformly mixing solution C with solution D evenly, spraying the mixture to the substrate, and curing the substrate to obtain the coating. A multi-stage micro nano hierarchical structure is constructed, which has good chemical stability, can completely repel N, N-dimethylformamide droplets (34.4 mN/m), and has a contact angle with n-Hexadecane (27.1 mN/m) of 120°. However, the adhesion effect between the obtained coating and the substrate is poor, and the coating has no flame resistance effect.

SUMMARY OF THE INVENTION

In order to overcome the above-mentioned problems, the present disclosure provides an abrasion-resistant, stable and flame-resistant superhydrophobic/superoleophobic coating, and a preparation and application thereof.

In order to achieve the foregoing technical objective, the present disclosure adopts the following technical solution:

A preparation method for a fluorine-containing curing agent includes the following steps:
1) respectively dissolving heptafluorobutyric acid (HFA) and 3-(2-aminoethylamino) propyltrimethoxysilane (AS) in deionized water;
2) dropwise adding the HFA solution to the AS solution; and
3) after the dropwise adding is completed, heating the solution to obtain light yellow colloid which is a fluorine-containing curing agent.

In step 3), the reaction was performed by heating at 100° C.

For the fluorine-containing curing agent, AS-HFA has no characteristic peak of stretching vibration of C=O in —COOH at 1770 $cm^{-1}$, while stretching vibration of —NH occurs at 3033 $cm^{-1}$; vibration of C=O occurs at 1678 $cm^{-1}$; and a composite vibration peak of deformation vibration of —NH and stretching vibration of —CN occurs at 1464 $cm^{-1}$, which indicates that an amide group is generated, representing successful fluorination of a curing agent. Because of the combination with a silane coupling agent, there are N—H, a fluorine containing chain and other functional groups, which can also be used in industrial production as a new type of functional coupling agent.

A preparation method for a superhydrophobic/superoleophobic suspension includes the following steps:
S1, dispersing 15 nm $SiO_2$, 50 nm $SiO_2$ and 25 μm α-cellulose in a mixed solution containing anhydrous ethanol and ammonia, and performing ultrasonic treatment for 30 min;
S2, dropwise adding TEOS and FAS to the solution formed in step S1, and stirring the same for 6 h in a water bath at 60° ° C. to obtain solution A;
S3, dissolving bisphenol A epoxy resin (EP) in the anhydrous ethanol solution, and performing ultrasonic oscillation for 30 min to obtain solution B;

S4, adding solution B to solution A in the water bath at 60° C.; after full mixing, quickly injecting the TEOS and the FAS into the suspension; and stirring the same at 60° C. for 2 h to obtain solution C, a volume ratio of solution B to solution A being 8:1;

S5, adding a fluorine-containing curing agent into absolute ethanol, and dissolving the fluorine-containing curing agent with ultrasonic waves to obtain solution D;

S6, adding solution D into solution C, and stirring the same for 20 min; and after full mixing, adding a flame retardant, and stirring the same to obtain a final uniform solution, a volume ratio of solution D to solution C being 48:5.

The above steps S1 to S6 are only for the convenience of description and do not represent an actual order. For example, the orders of S1, S2 and S3 can be interchanged, and the order of S5 can be interchanged with any of steps S1 to S4.

The flame retardant is 9,10-dihydro-9-oxa-10-phosphaphenanthrene-10-oxide (DOPO).

Preferably, in step S1, in the mixed solution of absolute ethanol and ammonia water, a volume ratio of the absolute ethanol to the ammonia water is (1-5): 1. Preferably, the volume ratio of the anhydrous ethanol to the ammonia water is 3:1.

In step S1, a mass ratio of the 15 nm $SiO_2$, 50 nm $SiO_2$ and 25 μm α-cellulose is 1:1:2.

In step S2, a volume ratio of the TEOS (2 mL) to the FAS (1 mL) is 2:1.

In step S3, the ultrasonic oscillation lasts for 30 min.

In step S4, a volume ratio of the TEOS to the FAS is 1:1.

In step S6, the amount of the DOPO is 1-6% of the total mass of the raw materials.

When the amount of the 15 nm $SiO_2$ accounts for 25% of the total amount of the nano particles and the content of the DOPO is 6%, the lyophobicity and flame resistance are good. The total amount of the nano particles refers to a total mass of the 15 nm and 50 nm $SiO_2$ and 25 μm cellulose.

mEP: mAS-HFA=1:1.066, that is, a ratio of the mass of the bisphenol A epoxy resin to the total mass of the AS-HFA (fluorine-containing curing agent) is 1:1.066.

A superhydrophobic/superoleophobic flame-resistant and abrasion-resistant coating material is characterized by being prepared with the above superhydrophobic/superoleophobic suspension. The preparation method is as follows:

spraying the suspension onto a surface of a horizontally placed substrate (such as glass, PU foam, and a PVC film) with a spray gun at a distance of 15 cm in a vertical direction, and then drying the surface in an oven at 120° C. for 6 h; and finally obtaining the superhydrophobic/superoleophobic flame-resistant and abrasion-resistant coating material.

The present disclosure further provides a preparation method for a bilayer abrasion-resistant, stable, flame-resistant superhydrophobic coating (BLC), including:

taking superhydrophobic/superoleophobic suspension as a top-layer spraying solution;

dispersing epoxy resin in a solvent, and adding a fluorine-containing curing agent and a flame retardant for reaction to obtain a bottom-layer spraying solution; and first spraying the bottom-layer spraying solution to a surface of a substrate, then spraying the top-layer spraying solution, and drying the surface to obtain a bilayer abrasion-resistant superhydrophobic flame-resistant coating.

The superhydrophobic/superoleophobic suspension contains multi-level micro nano structural particles, fluorine-containing curing agent and fluorinated epoxy resin. A distance between the spray gun and the surface of the substrate is 12-20 cm.

The substrate is a glass slide, an aluminum plate or a stainless steel plate.

Specific drying conditions are: 6-8 h at 120-130° C.

In order to overcome the problem that introduction of a flame retardant into a superhydrophobic/superoleophobic coating will have a negative impact on the superhydrophobic performance of the coating, the prevent disclosure provides a method for preparing an abrasion-resistant, stable and flame-resistant superhydrophobic/superoleophobic coating by compounding the flame retardant with the superhydrophobic/superoleophobic suspension. It is found in a study that compared with a single-layer coating prepared by directly adding the flame retardant to the superhydrophobic/superoleophobic suspension, a coating obtained using a preparation policy of combining a multi-stage structure with a multi-layer structure and not blending a flame-resistant material with a hydrophobic material has better hydrophobicity, flame resistance and mechanical properties.

The present invention further provides a bilayer superhydrophobic coating (BLC) prepared by any of the above methods. The BLC refers to a bilayer superhydrophobic coating.

The present invention further provides a single-layer abrasion-resistant, stable and flame-resistant superhydrophobic/superoleophobic coating, including:

adding a flame retardant into a superhydrophobic/superoleophobic suspension, and uniformly mixing the same to obtain a flame-resistant superhydrophobic/superoleophobic suspension; and spraying the flame-resistant superhydrophobic/superoleophobic suspension to a surface of a substrate, and drying the surface to obtain the abrasion-resistant and flame-resistant superhydrophobic/superoleophobic coating material.

The superhydrophobic/superoleophobic suspension contains multi-level micro nano structural particles, fluorine-containing curing agent and fluorinated epoxy resin. The substrate is glass, PU foam or a PVC film. The present invention provides a simple and feasible method, that is, using a multi-stage structure and a polyfluorination policy to prepare a multifunctional flame-resistant superhydrophobic/superoleophobic coating with high lyophobicity, high stability and low cost, and the coating can be sprayed on a large scale. The coating has excellent repellency to water and various liquids with low surface tension (21 mN·m$^{-1}$), and can be adhered to various kinds of substrates such as organic and inorganic substrates (including PTFE with extremely low surface tension). The coating can also resist harsh physical abrasion and various extreme environments (high temperature, aqua regia, and strong alkali corrosion), and even performs well in delaying metal corrosion. Of course, the coating has excellent flame resistance. Because of its practical application advantages and industrial production potential, the coating can be expected to be sprayed to various buildings or military facilities on large scale. In order to achieve these excellent performances, the following measures are taken in the present disclosure. First, in the present disclosure, a proportion of a multi-stage micro nano structure is researched, and then the multi-stage micro nano structure is fluorinated to provide excellent lyophobicity. Secondly, in the present disclosure, a new type of fluorinated silane coupling agent is developed, which has a curing effect, thus obtaining fluorinated epoxy resin, so that the coating can obtain an adhesion without losing the superlyophobicity. Finally, the DOPO is used to provide a flame resistance effect. The present invention further provides a single-layer abrasion-resistant, stable and flame-resistant superhydrophobic/superoleophobic coating prepared by the above method.

On the basis of the multistage structure and the polyfluorination strategy, the present disclosure successfully overcomes the problem of incompatibility between the lyophobicity and stability of the coating for a long time by researching a relationship between a curing temperature and molecular chain motion.

The present disclosure further provides applications of the above BLC and the single-layer superhydrophobic/superoleophobic coating in the fields of energy, chemical industry, machinery, aerospace, medicine or intelligent equipment.

The present disclosure has the beneficial effects:

In the present disclosure, according to the preparation policy of not blending a flame-resistant material with a lyophobic material, the single-layer coating and the BLC are respectively prepared by combining the multi-stage structure and the polyfluorination strategy with the multi-stage structure and the multi-layer structure, thereby obtaining a coating with both hydrophobicity and flame resistance and good mechanical properties. The details are as follows:

(1) The coating has both the lyophobicity and stability. The conventional incompatibility between the lyophobicity and the stability can be solved by adjusting a temperature during the preparation. The coating has excellent repellency to water and various liquids with low surface tension (21 mN·m$^{-1}$), and can be adhered well to various substrates such as organic and inorganic substrates (including PTFE with extremely low surface tension). The coating has excellent mechanical properties and can withstand abrasion of a high-speed friction machine. The coating has an excellent corrosion resistance effect, which can significantly reduce the corrosion rate of metal in aqua regia. The coating can obviously reduce the corrosion rate of iron, which has a great application prospect in the field of corrosion prevention.

(2) The coating has good flame resistance and thermal insulation performance, which can reduce heat and gas emission and better insulate heat, thus reducing hazards of a fire.

(3) In the present disclosure, a new type of fluorine-containing curing agent is synthesized. Due to the special structure of its multifunctional group, the fluorine-containing curing agent can be used as a new type of coupling agent in industrial production and application.

In summary, the coating composed of the $SiO_2$ and cellulose particles of different sizes, the epoxy resin and flame retardant has excellent performance, and its application will expanded the application range of multifunctional coatings. The coating has a high application potential especially in the field of architecture.

BRIEF DESCRIPTION OF THE DRAWINGS

The accompanying drawings of the specification, which form a part of the present disclosure, are used to provide a further understanding of the present disclosure. The schematic embodiments and their descriptions of the present disclosure are used to explain the present disclosure, and do not constitute an improper limitation to the present disclosure.

FIG. 29 shows classification of adhesion test results according to ASTM D3359.

DETAILED DESCRIPTION OF THE EMBODIMENTS

The present disclosure is further described below in combination with specific embodiments, but the present disclosure is not limited to this.

Explanation of Terms

TEOS: tetraethyl orthosilicate.
FAS: perfluorooctyl trimethoxysilane.
DOPO: 9,10-dihydro-9-oxa-10-phosphophenanthrene-10-oxide.
EP: E-51 bisphenol A epoxy resin.

1) Experimental Materials and Instruments

2) Test on the Mechanical Stability of the Superhydrophobic/Superolcophobic Coating (1) Mechanical Abrasion Test The mechanical properties of a coating are researched with an automatic friction meter (Gotech, GT-7034-E, China). A mechanical abrasion test sample is glass coated with a coating and having a size of 8 cm×3 cm. The glass coated with a superhydrophobic/superoleophobic coating is placed on a test instrument and fixed as shown in the figure below. A friction bar of a friction cycle machine is composed of two parts, i.e. a weight of 500 g at the top and P600 abrasive paper at the bottom. The friction bar is vertically placed on the glass, and the abrasive paper is in full contact with a coating surface of the friction bar. A one-way movement distance of the friction bar is 10 cm, and the friction bar moves in a direction indicated by the red arrow. It is defined that a movement of 10 cm back and forth is as a friction cycle. The mechanical stability of the coating is tested, and the impact of friction on the lyophobicity of the coating is researched by using changes in a contact angle of n-Hexadecane. Different regions of each sample are measured for

TABLE 1

Main raw materials and reagents

| Name | Molecular | Manufacturer | Remarks |
| --- | --- | --- | --- |
| Heptafluorobutyric acid | $C_4HF_7O_2$ | Aladdin Biochemical Technology Co., Ltd | Analytical reagent |
| 9,10-dihydro-9-oxa-10-phosphophenanthrene-10-oxide | $C_{12}H_9O_2P$ | Aladdin Biochemical Technology Co., Ltd. | Analytical reagent |
| 3-(2-aminoethylamino) propyltrimethoxysilane | $C_8H_{22}N_2O_3Si$ | Aladdin Biochemical Technology Co., Ltd | Analytical reagent |
| Bisphenol A epoxy resin | $(C_{21}H_{24}O_4)$ x- | Nantong Xingchen Synthetic Material Co. Ltd. | Analytical reagent |
| NaOH | NaOH | Sinopharm Chemical | Analytical reagent |
| Acetone | $CH_3COCH_3$ | Sinopharm Chemical ReagentCo., Ltd. | Analytical reagent |

TABLE 2

Main experimental instruments and equipment

Figure 1:
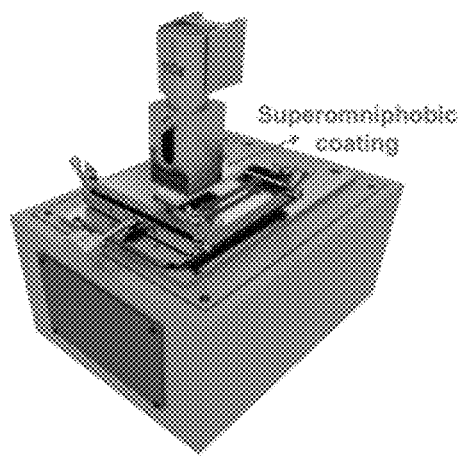
FIG. 1 is a schematic diagram of a mechanical abrasion test.

| Instrument | Model number | Manufacturer |
| --- | --- | --- |
| Automatic friction meter | GT-7034-E | GOTECH TESTING MACHINES CO., LTD. |
| Microcomputer controlled electronic universal testing machine | WDW-02 | Ji'nan Thinks Permanently Grand Test |
| Tensile testing machine | WDW-02 | Ji'nan Thinks Permanently |
| Electrochemical tester | CHI 660E | Grand Test Co., Ltd. |
| Smoke density meter | ZY6166B-PC | Shanghai Chenhua |
| Cone calorimeter | FTT0007 | Instruments Co., Ltd. |
| Oxygen index measuring instrument | FTT0077 | Dongguan Zhongnuo Instruments Co., Ltd. |
| Electrochemical tester | CHI 660E | Shanghai Chenhua Instruments Co., Ltd. |
| Cone calorimeter Oxygen index measuring instrument | FTT0007 | Fire Testing Technology (FTT) |
|  | FTT0077 | Fire Testing Technology (FTT) | three times to obtain an average value of static contact angles. Before the measurement of the contact angle, abrasion shall appear on the sample, as shown in FIG. 1.

(2) Test on the Adhesion of the Coating

Figure 2:
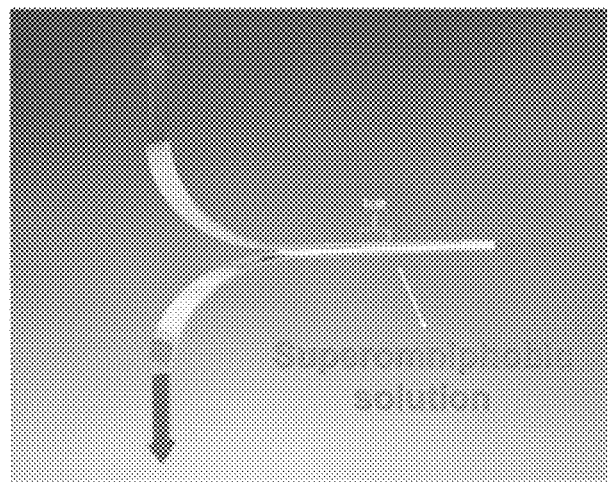
FIG. 2 is a schematic diagram of an adhesion test.

A tensile testing machine (Hensgrand, WDW-02, China) is used to test an adhesion at a room temperature at a tensile speed of 100 mm min-1. Two substrates are pressed together with a superhydrophobic/superoleophobic solution and are cured at 80° C., with a covering area of 10 mm×100 mm and a thickness of 2 mm. One side is fixed on the tensile testing machine, and the other side is stripped off, as shown in FIG. 2.

1) Electrochemical Test on a Superhydrophobic/Superoleophobic Coating

A Tafel polarization curve and an EIS test are carried out in a 3.5 wt % NaCl solution. A CHI 660E electrochemical workstation with a three-electrode system is used for measurement at the room temperature. A reference electrode is a saturated calomel electrode (SCE). A carbon electrode is a counter electrode. A metal sample of 2 cm×2 cm is used as a working electrode. Before the electrochemical measurement, all the metal samples are immersed in the 3.5 wt % NaCl solution for 40 min to ensure that the test is carried out at a stable open circuit potential (OCP). A scanning rate of a polarization curve is 2 mV s$^{-1}$. An EIS experiment is carried out in a frequency range of 10-2 Hz-105 Hz, and a sinusoidal signal disturbance is 5 mV. Each test is repeated for three times to ensure the accuracy of experimental results.

1) Test on the Flame Resistance of the Superhydrophobic/Superoleophobic Coating

First, a smoke density test is carried out using the smoke densitometer (ZY6166B-PC, China) according to the standard ISO 5659, and a sample has a dimension of 75 mm×75 mm×3 mm. Second, cone calorimetry is carried out using the cone calorimeter (FTT0007, UK) at a heat flux of 50 kW·m$^{-2}$ according to the test standard ISO 5660, and a sample has a dimension of 10 cm×10 cm×1 cm. Third, a limit oxygen index (LOI) is tested using an oxygen index measurement instrument (FTT0077, UK), and a sample has a dimension of 10 cm×1 cm×1 cm (based on the standard ASTM D2863). In the present disclosure, ten groups of parallel tests are carried out, and an average value is adopted to ensure the data accuracy.

1) Thermal Insulation Performance Test on the Superhydrophobic/Superoleophobic Coating An alcohol blowtorch is used as an ignition source. A steel plate coated with the superhydrophobic/superoleophobic coating on one side is used as a sample. The side coated with the superhydrophobic/superoleophobic coating faces down and is in contact with an external flame of the alcohol blowtorch, and the other side faces up. An infrared thermometer is used to test a back temperature of the sample in real time. One temperature point is taken down every 5 s to obtain a back temperature change diagram of the steel plate, so as to evaluate the thermal insulation performance of different samples.

Embodiment 1

Preparation of a Superhydrophobic/Superoleophobic Suspension

First, 15 nm SiO$_2$ (0.5 g), 50 nm SiO$_2$ (0.5 g) and 25 μm α-cellulose were dispersed in a mixed solution containing anhydrous ethanol (30 mL) and ammonia (10 mL), and ultrasonic treatment was performed for 30 min. TEOS (2 mL) and FAS (1 mL) were dropwise added to the above solution and were stirred for 6 h in a water bath at 60° C. to obtain solution A.

Second, bisphenol A epoxy resin (EP, 1.0 g) was dissolved in an anhydrous ethanol (5 mL) solution, and ultrasonic oscillation was performed for 30 min to obtain solution B. Next, solution B was added to solution A in the water bath at 60° C. After full mixing, 0.6 mL of TEOS and 0.6 mL of FAS were quickly injected into the suspension and stirred at 60° C. for 2 h to obtain solution C.

Preparation of a Superhydrophobic/Superoleophobic Suspension 0.535 mL of heptafluorobutyric acid (HFA) and 0.57 mL of 3-(2-aminoethylamino) propyltrimethoxysilane (AS) were respectively dissolved in 10 mL of deionized water and were stirred for 15 min for complete dissolving. An HFA solution was dropwise added to an AS solution. After the dropwise adding was completed, the reactants were heated at 100° ° C. to initiate a fluorination reaction through a reaction between a carboxyl group and amine. All water was evaporated by heating to obtain light yellow colloid which was a fluorine-containing curing agent. 5 mL of absolute ethanol was added and was dissolved with ultrasonic waves to obtain solution D.

Preparation of a Superhydrophobic/Superoleophobic Coating

Solution D was added into solution C and stirred for 20 min. After full mixing, 0.6 g of DOPO was added and stirred 20 min to obtain a final uniform solution. 5 mL of the suspension was sprayed onto a surface of a horizontally placed substrate (such as glass, PU foam, and a PVC film) with a spray gun (ET4000, STAT, Germany) at a distance of 15 cm in a vertical direction, and then the surface was dried in an oven at 120° C. for 6 h. Finally, the superhydrophobic/superoleophobic flame-resistant and abrasion-resistant coating material was obtained.

Figure 3:
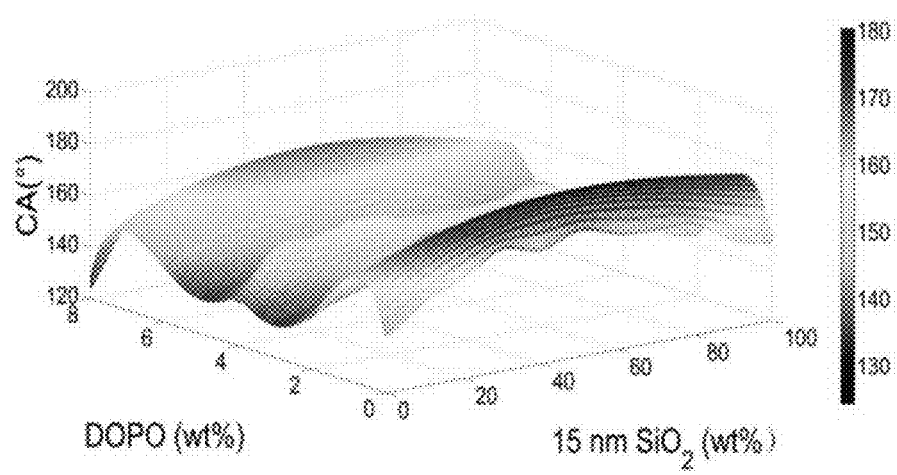
FIG. 3 shows the impact of the content of DOPO and the content of $SiO_2$ on the lyophobicity.

Results and Discussion 2.1 Impact of the Amount of a Flame Retardant on the Lyophobicity and Flame Resistance of the Coating Generally, the increase of the amount of the flame retardant will promote the flame resistance of the material, but the flame retardant often has extremely high polarity and hydrophilicity. The presence of polar functional groups in the flame retardant will certainly affect the lyophobicity of the coating. Therefore, the present disclosure researches the impact of a mass ratio of the 15 nm SiO$_2$ particles to the DOPO in the superhydrophobic/superoleophobic solution on the lyophobicity and flame resistance of the coating, so as to seek the best ratio. Thus, the impact of the flame retardant on the hydrophobicity is minimized. As shown in FIG. 3, a contact angle of n-Hexadecane represents the lyophobicity of the coating. It can be seen that when the amount of the 15 nm SiO$_2$ accounts for 50% of the total amount of nano particles, the coating has the best ability to repel water. With the adding of the DOPO, the flame resistance of the coating increases, but the lyophobicity decreases. The content of the DOPO is adjusted on the basis of ensuring the lyophobicity. It can be seen that when the content of DOPO is 6%, the coating has relatively good lyophobicity and flame resistance. The impact of the content of the DOPO and the content of the SiO$_2$ on the lyophobicity is shown in FIG. 3 and Table 3.

TABLE 3

Impact of the content of the DOPO and the content of the SiO$_2$ on the lyophobicity

| | Mass ratio (%) of 15 nm SiO2 particles in the system | | | | | | | | | | |
|---|---|---|---|---|---|---|---|---|---|---|---|
| | 0 | 10 | 20 | 30 | 40 | 50 | 60 | 70 | 80 | 90 | 100 |
| Contact angle (°) | 158.3 | 159.2 | 160.5 | 164.3 | 167.9 | 172.6 | 170.6 | 170.2 | 167.5 | 162.5 | 160.5 |

| | Mass ratio (%) of DOPO particles in the system | | | | | | | | |
|---|---|---|---|---|---|---|---|---|---|
| | 0 | 1 | 2 | 3 | 4 | 5 | 6 | 7 | 8 |
| Contact angle (°) | 172.6 | 156.4 | 152.5 | 159.7 | 164.3 | 159.2 | 167.2 | 162.5 | 154.2 |

When the amount of the 15 nm SiO$_2$ accounts for 25% of the total amount of the nano particles and the content of the DOPO is 6%, the lyophobicity and flame resistance are good. The total amount of the nano particles refers to a total mass of the 15 nm. 50 nm and 25 μm cellulose.

2.2 Polyfluorination Policy

Figure 4:
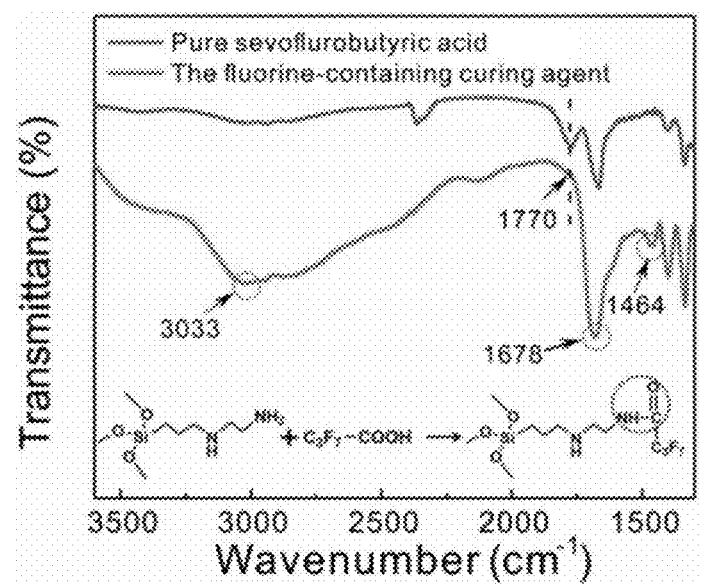
FIG. 4 is an infrared spectrogram of a fluorine-containing curing agent.

There is a general condition that a lyophobic coating is not durable, or a durable coating is not lyophobic. An adhesion of a coating often relies on connection between a polar group and a substrate, so improving the adhesion will affect the lyophobicity of the coating to a certain extent. Based on this, in order to further improve the adhesion of the coating on the basis of ensuring the flame resistance and lyophobicity of the coating, the present disclosure adopts a polyfluorination policy in an epoxy resin system. That is, when FAS is added to reduce the surface energy, a curing agent for epoxy resin is fluorinated. That is, AS-HFA is used as a curing agent to cooperate with the epoxy resin to obtain a coating with lyophobicity, flame resistance and mechanical properties. A fluorinated amine curing agent is synthesized by using an AS and HFA fluoropolymer. FIG. 4 shows an infrared spectrogram of fluorination of a curing agent. It can be seen from the figure that compared with a pure HFA solution, the AS-HFA has no characteristic peak of stretching vibration of C=O in —COOH at 1770 cm$^{-1}$, while stretching vibration of —NH occurs at 3033 cm-1; vibration of C=O occurs at 1678 cm$^{-1}$; and a composite vibration peak of deformation vibration of —NH and stretching vibration of —CN occurs at 1464 cm$^{-1}$, which indicates that an amide group is generated, representing successful fluorination of the curing agent. Because of the combination with a silane coupling agent, there are N—H, a fluorine containing chain and other functional groups, which can also be used in industrial production as a new type of functional coupling agent. The infrared spectrogram of the fluorine-containing curing agent is as shown in FIG. 4.

2.3 Research on the Amount of the Fluorine-Containing Curing Agent

Figure 5:
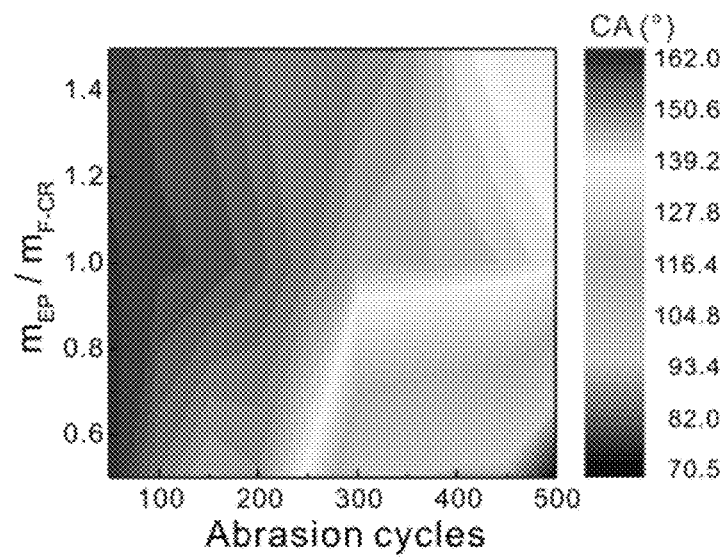
FIG. 5 shows a relationship between the amount of the fluorine-containing curing agent and the mechanical stability of a coating.

In a curing process, the amount of the curing agent will have a huge impact on the mechanical stability of the coating. Therefore, superhydrophobic/superoleophobic coatings with curing agents in different proportions and epoxy resin were prepared in the present disclosure, and were subjected to a friction cycle test, thus finally selecting a superhydrophobic/superoleophobic solution with the best performance and determining the optimal amount of the fluorine-containing curing agent. The friction cycle test was carried out using a high-speed friction cycle machine. Experimental results are shown in FIG. 5. After 100 friction cycles, the contact angles of the n-Hexadecane of the coatings with different proportions are basically greater than 160°. At this time, a proportioning relationship between the curing agent and the epoxy resin has no obvious effect on the mechanical properties and lyophobicity of the coating. However, as the number of friction cycles continues to increase, it is found that the contact angle starts to drop significantly. For example, when mEP: mAS-HFA=0.6, the coating has basically lost its lyophobicity after 500 friction cycles. Moreover, when the curing agent is excessive, the contact angle of the coating is reduced to about 100° after only 250 friction cycles, and the superomniphobicy effect is also be lost. Therefore, by the comparison of the above experimental results, it can be found that when mEP: mAS-HFA=1: 1.066, the coating has good hydrophobicity. When mEP: mAS-HFA=1, the coating has the best performance. At this time, the coating can withstand 500 friction cycles. Furthermore, the contact angle of the n-Hexadecane after the friction is about 130°, the coating shows excellent mechanical stability and lyophobicity. Therefore, the amount of the curing agent and the amount of the epoxy resin used in the system of the present disclosure is 1:1. A relationship between the amount of the fluorine-containing curing agent and the mechanical stability of the coating is shown in FIG. 5.

TABLE 4

Relationship between the amount of fluorine-containing curing agent and the mechanical stability of the coating

| | Number of cycles | | | | | | | | |
|---|---|---|---|---|---|---|---|---|---|
| | 100 | 150 | 200 | 250 | 300 | 350 | 400 | 450 | 500 |
| The mass ratio of the epoxy resin to the fluorine-containing curing agent is 1:2 | | | | | | | | | |
| Contact angle (°) | 152.3 | 146.2 | 148.3 | 136.9 | 100.2 | 95.2 | 90.6 | 90.2 | 70.5 |

TABLE 4-continued

Relationship between the amount of fluorine-containing curing agent and the mechanical stability of the coating

| | Number of cycles | | | | | | | | |
|---|---|---|---|---|---|---|---|---|---|
| | 100 | 150 | 200 | 250 | 300 | 350 | 400 | 450 | 500 |
| The mass ratio of the epoxy resin to the fluorine-containing curing agent is 1:1 | | | | | | | | | |
| Contact angle (°) | 160.3 | 159.7 | 155.4 | 152.6 | 150.3 | 150.1 | 148.6 | 146.2 | 145.8 |
| The mass ratio of the epoxy resin to the fluorine-containing curing agent is 2:3 | | | | | | | | | |
| Contact angle (°) | 157.6 | 155.4 | 152.3 | 150.9 | 148.6 | 142.4 | 140.2 | 135.9 | 132.6 |

2.4 Research on an Adhesion Mechanism of the Coating

In the present disclosure, it is found that during curing at a relatively low temperature, the coating has poor lyophobicity and adhesion, according to which, the present disclosure assumes that the curing temperature may have a greater impact on the performance of the coating. Therefore, a control experiment was set at 60° ° C. to verify the impact of a curing temperature on the performance of the coating. It is found through the experiment that the lyophobicity and stability of the coating are not ideal when the coating was cured at 60° C., while the adhesion and stability of the coating are significantly improved when the coating was cured at 120° C. Based on this phenomenon, the present disclosure assumes that when the coating is cured at different temperatures, the surface mobility of a fluorine chain may change, and the strength of an interaction between a polar group in the coating and a polar group on the surface of the substrate may change.

Figure 6:
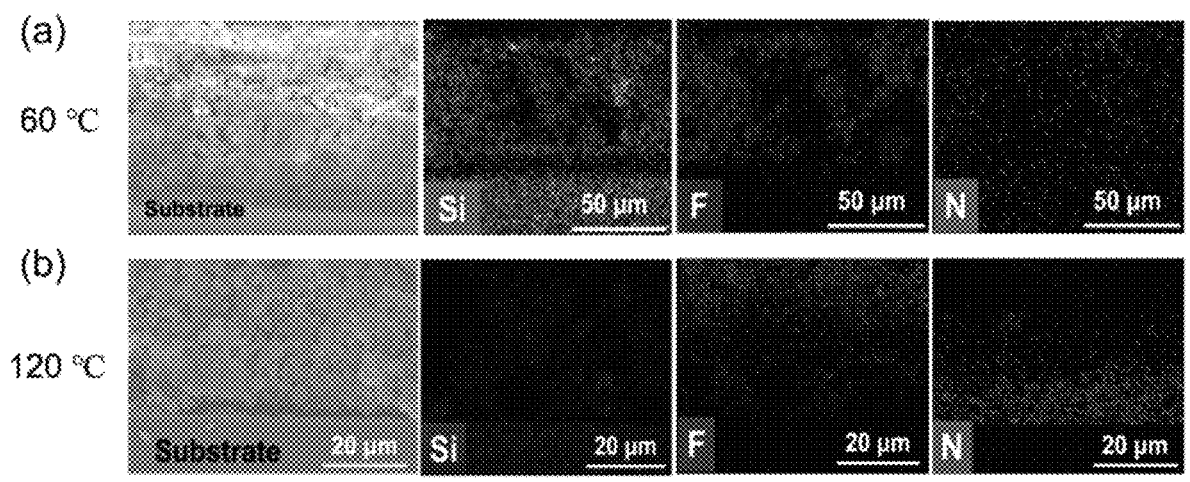
FIG. 6 shows an element distribution on a section of a coating cured at different temperatures: 60° C. in (a) and 120° C. in (b).

Therefore, in the present disclosure, a section and surface of the coating are analyzed through an energy disperse spectroscopy (EDS) and an X-ray photoelectron spectroscopy (XPS). First, in an EDS diagram of the section of the coating (FIG. 6), when the coating is cured at 60° C., Si, F, N and other elements were uniformly distributed on the section of the coating. From this, it can be seen that there is no obvious surface migration phenomenon of the fluorine-containing chain for reducing the surface energy, and there is no effective aggregation formed on the surface, resulting in poor lyophobicity of the coating. Moreover, the uniform distribution of N may result in a fewer of interaction bonds between the coating and the substrate, and acting forces such as hydrogen bonds are low, leading to poor stability of the coating. When the coating is cured at 120° C., F changes in gradient and is enriched on the surface, so that the coating has high lyophobicity; N is enriched on a contact surface with the substrate, and there are many polar groups near the substrate, so that N can be well combined with the substrate, making the coating have a high stability. In addition, there are relatively few polar groups on the surface of the coating, which has little impact on the lyophobicity of the coating. Therefore, it can be determined that chains may migrate when the coating is cured at a high temperature, making the coating have high lyophobicity and stability. FIG. 6 shows an element distribution on the section of the coating cured at different temperatures: 60° C. in (a) and 120° C. in (b).

Figure 7:
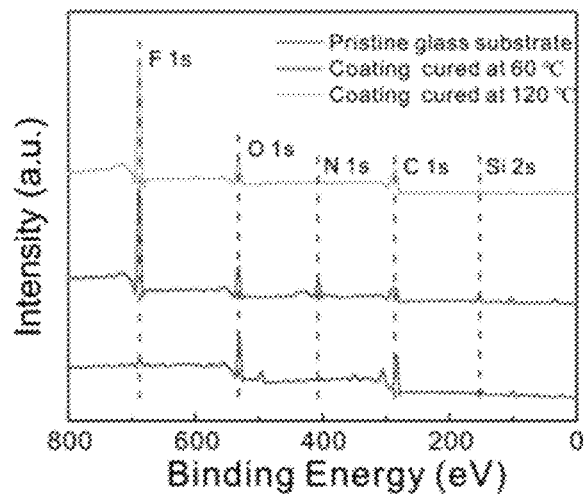
FIG. 7 is an XPS diagram of a surface of a coating cured at different temperatures.

In order to further verify the guess of the present disclosure, the XPS was used to make more researches on element compositions on the surface of the coating to determine the impact of a curing temperature on the element distribution, as shown in FIG. 7. Glass was taken as an example. For pristine glass, peaks at 103 eV, 285 eV and 532 eV were Si 2p, C 1s, and O 1s. When the glass was coated with the superhydrophobic/superoleophobic coating, peaks at 688.4 eV and 399.6 eV corresponding to F1s and N1s were from the superhydrophobic/superoleophobic coating. The peak strength of F in the coated glass obviously increases, while the peak strength of O and C obviously decreases. When the curing at 120° C. is compared with the curing at 60° C., the strength of F obviously increases, while the strength of N, O and other polar elements obviously decreases. In particular, the element strength peak of N can hardly be seen at N1s. That is, during curing at a high temperature, the peak strength of an element changes significantly. The surface enrichment of fluorine and the migration of polar functional groups make the coating of the present disclosure have excellent lyophobicity and stability at the same time. FIG. 7 shows an XPS diagram of a surface of a coating cured at different temperatures.

2.5 Analysis of Surface Morphology of the Coating

Figure 8:
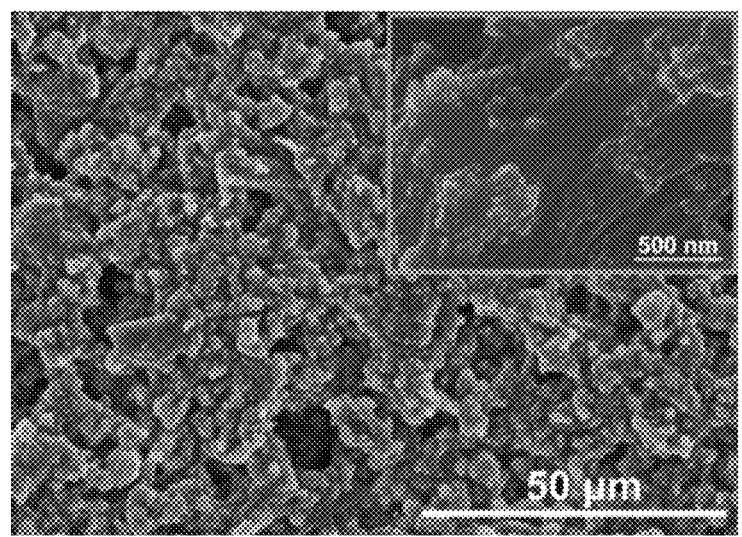
FIG. 8 is an SEM image of a surface of a superhydrophobic/superoleophobic coating.

FIG. 8 shows SEM analysis of a coating. It can be seen that epoxy resin and micro nano particles are uniformly bonded to ensure the excellent stability of the coating while providing the lyophobicity. FIG. 8 shows an SEM image of a surface of a superhydrophobic/superoleophobic coating.

2.6 Test on the Adhesion of the Coating

Figure 9:
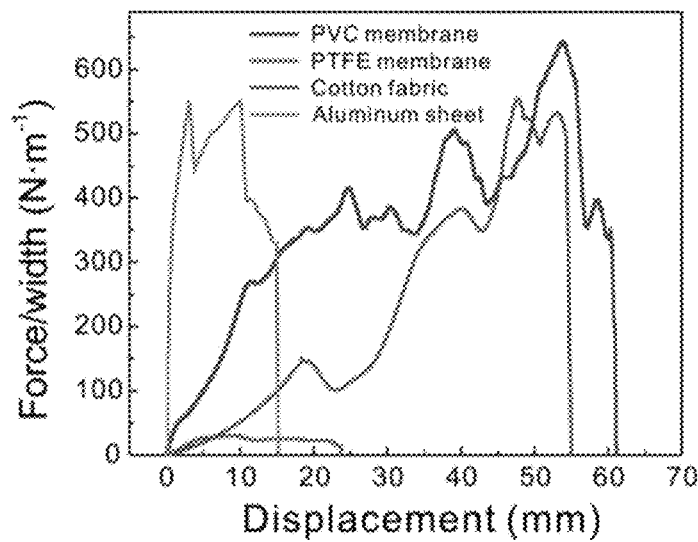
FIG. 9 is a test on adhesions of the superhydrophobic/superoleophobic coating to different surfaces.

There are many polar groups in epoxy resin and a curing agent. With these groups, the superhydrophobic/superoleophobic coating of the present disclosure can be adhered to different types of substrates. In the present disclosure, T-Peeling was used to test the adhesion of the coating on different substrates. The superhydrophobic/superoleophobic coating was coated on four different types of substrates that are all 100 mm×10 mm in length and width, such as a PVC film, a PTFE film, cotton cloth and an aluminum sheet. The coating had a thickness of about 2 mm, and a tensile test was carried out on a universal tensile machine. Test results are shown in FIG. 9. It can be seen that the coating of the present disclosure has good adhesion, and the maximum adhesion on the PVC film can reach 647.2 N·m$^{-1}$. The coating has a certain binding force with the PTFE film with low surface energy. To sum up, the coating can be applied to various types of substrates, and maintains excellent lyophobicity and mechanical properties on different substrates. FIG. 9 shows a test on adhesions of the superhydrophobic/superoleophobic coating to different surfaces. A preferred adhesion range is 30-600 N·m$^{-1}$.

Figure 10:
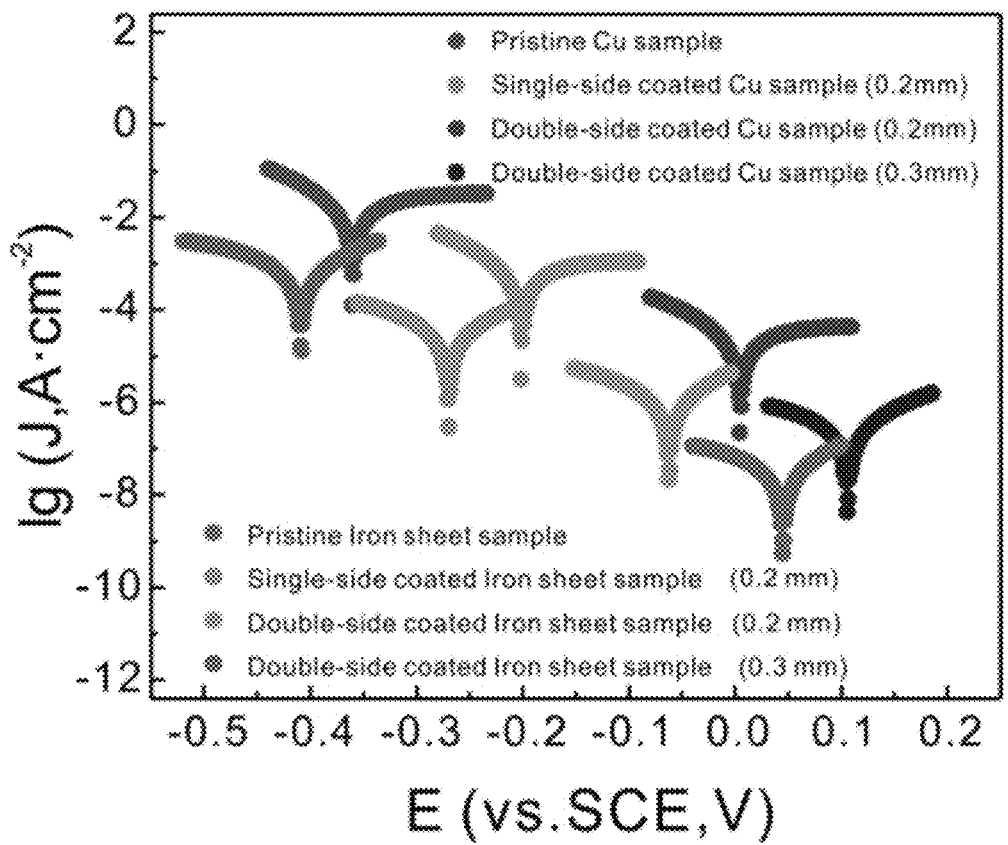
FIG. 10 shows a Tafel polarization curve of different samples.

2.7 Research on Application of the Flame-Resistant Superhydrophobic/Superoleophobic Coating to Metal Corrosion Protection In the present disclosure, the corrosion resistances of a pristine metal and metals coated with the superhydrophobic/superoleophobic coating at different thicknesses on a single side/double sides were evaluated by an electrochemical test in a NaCl aqueous solution of 3.5 wt. %. A Tafel polarization curve is a standard method for researching the corrosion performance. In this curve, a lower self-corrosion potential ($E_{corr}$) indicates a higher corresponding corrosion probability. A corrosion current ($I_{corr}$) is a measure of a corrosion rate. A larger value of the corrosion current indicates a larger corrosion rate. FIG. 10 shows the Tafel polarization curves of a pristine copper sheet, a pristine iron sheet, and a copper sheet and iron sheet which are coated with the superhydrophobic/superoleophobic coating at different thicknesses on a single side/double sides. The pristine copper sheet and iron sheet had the $E_{corr}$ of about −0.36 V and −0.41 V respectively, and had the $I_{corr}$ of about $7.43 \times 10^{-1}$ A·cm$^{-2}$, $1.051 \times 10^{-3}$ A·cm$^{-2}$. When the superhydrophobic/superoleophobic coating was sprayed, it was obvious that $E_{corr}$ increased and $I_{corr}$ decreased, and the corrosion resistance of double-side coating was much better than that of single-side coating. With the increase of a coating thickness, the $E_{corr}$ of the sample gradually moves to a positive direction and the $I_{corr}$ also gradually decreases. The $E_{corr}$ becomes 0.105 V and 0.046 V, and the $I_{corr}$ is about $1.457 \times 10^{-6}$ A·cm$^{-2}$ and $2.292 \times 10^{-7}$ A·cm$^{-2}$. This means that the superhydrophobic/superoleophobic coating reduces the corrosion probability and corrosion rate of the metal sample. The Tafel polarization curves of different samples are shown in FIG. 10.

Compared with other research work, this research makes better corrosion resistance, especially in slowing down the corrosion rate. This may be because: When a sample coated with the superhydrophobic/superoleophobic coating is immersed in a corrosion medium, a multi-stage micro nano structure on the surface of the sample can capture a lot of air. On the one hand, these air layers can reduce a contact area between the coating and the corrosion solution, and on the other hand, the air layers can effectively prevent the corrosion medium from entering the coating. Therefore, when the coating is in contact with the corrosion medium, the metal with this coating has certain advantages in stability.

Figure 11:
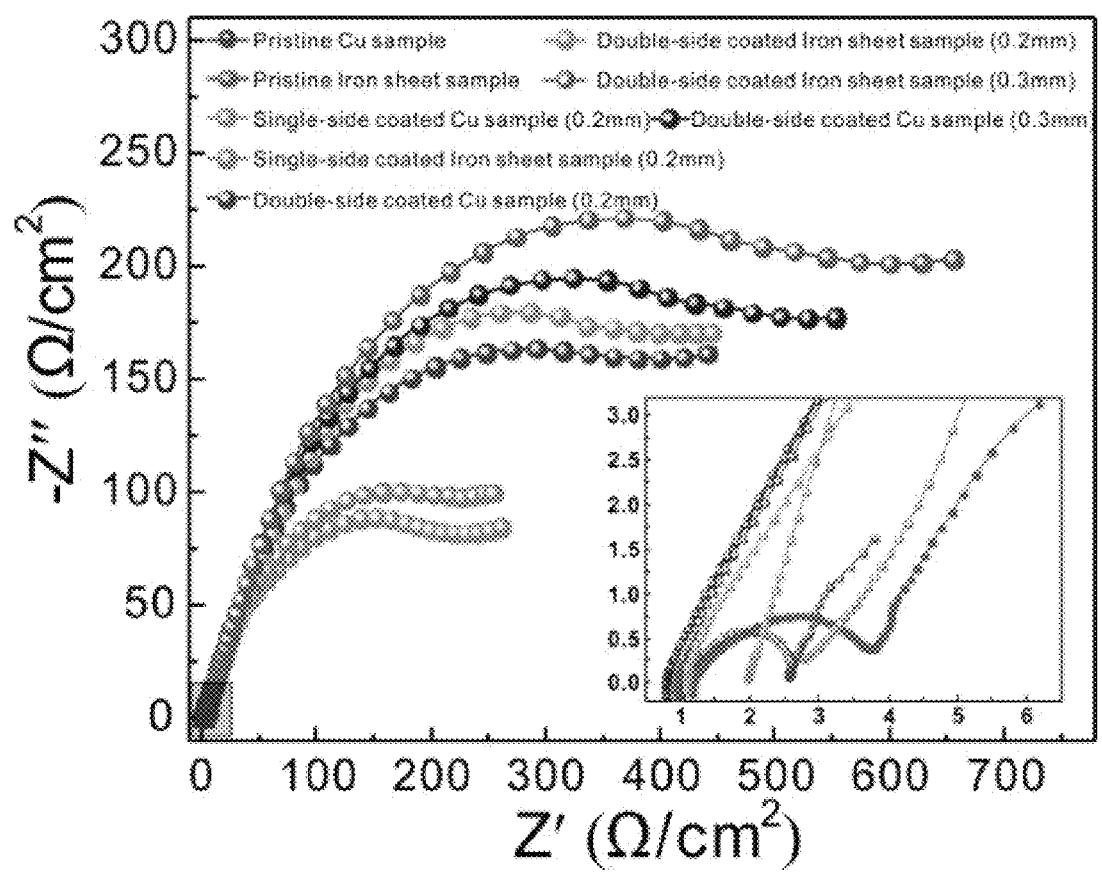
FIG. 11 shows electrochemical impedance spectroscopies of different samples.

In addition, in the present disclosure, the EIS was also used to partially test the surface kinetics of the pristine copper/iron sheet and the coated copper/iron sheet, so as to further evaluate the corrosion resistance of the superhydrophobic/superoleophobic coating, as shown in FIG. 11. In a Nyquist map, a bending radius of a capacitive reactance arc is related to an impedance value of the coating. A larger bending radius indicates a greater impedance value. That is, a larger value of the corrosion resistance indicates a higher charge transmission resistance and harder corrosion. It can be seen from FIG. 11 that the bending radius of the capacitive reactance arc is increased significantly after a single layer of the superhydrophobic/superoleophobic coating is sprayed. The bending radius of the capacitive reactance arc is further increased when single-side spraying is replaced by double-side spraying (0.2 mm). That is, the double-side superhydrophobic/superoleophobic coating can provide a higher charge transfer resistance for the metal sample. This may be because there is still some corrosion in the single-side coated samples. Double-side spraying can avoid this problem. When the spraying thickness of the coating increases to 0.3 mm, the bending radius of the capacitive reactance arc is the largest, and the impedance value of the metal increases from 4 Ω·cm$^{-2}$ to 600 Ω·cm$^{-2}$. At this time, the charge transfer resistance is the highest, and the corrosion reaction is the most difficult to carry out, which indicates that the superhydrophobic/superoleophobic coating can effectively reduce the corrosion reaction. FIG. 11 shows electrochemical impedance spectroscopies of different samples.

Figure 12:
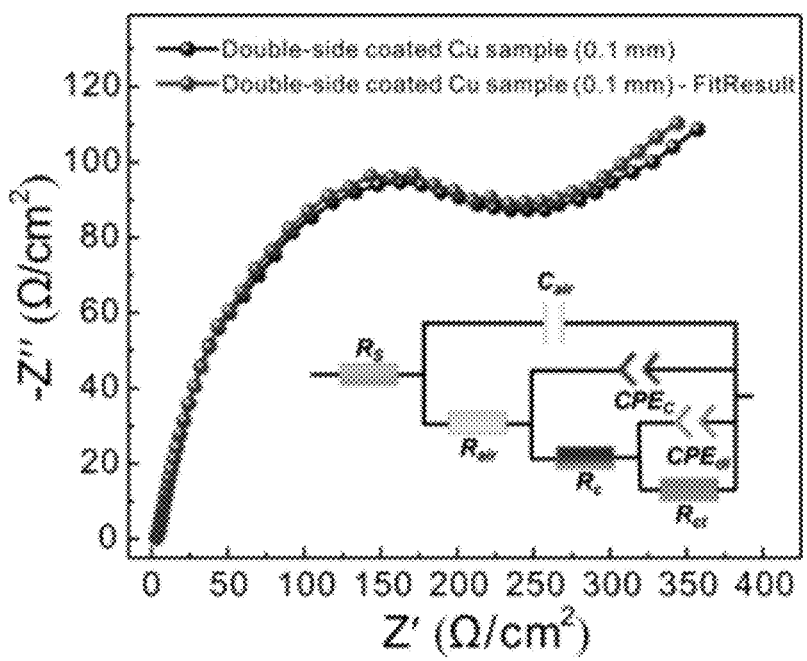
FIG. 12 shows an electrochemical impedance spectroscopy (EIS) fitted curve of a double-side coated sample, and the illustration is an equivalent circuit diagram.

The present disclosure uses an equivalent circuit to research a corrosion process, as shown in FIG. 12. The figure shows an EIS data curve of a double-side coated sample (0.1 mm). The blue line is an experimental data line, and the red line is a fitted data line. There is a high overlap degree between the two lines. The equivalent circuit diagram is shown in the figure. Due to a non-ideal state of the coating, a constant phase angle element CPE is selected to replace a capacitor, where $R_S$ is a solution resistance; $C_{air}$ and $R_{air}$ are related to the air layers in holes of the micro nano structure; $CPE_c$ and $R_C$ are a capacitance and resistance of the superhydrophobic/superoleophobic coating, indicating an interface reaction impedance between the corrosion medium and the coating; $CPE_{dl}$ is an electrical bilayer capacitance; and $R_{CT}$ is a transfer resistance which is a key parameter to evaluate the corrosion resistance of the coating, indicating the interface reaction impedance between the coating and the metal substrate. It can be better understood from the equivalent circuit diagram that the superhydrophobic/superoleophobic coating has excellent corrosion resistance due to the existence of the air layers.

However, when the metal is used in practice, there will be various harsh and complex environments. In order to research the wide applicability of the coating, in the present disclosure, the stability of the coating is tested by immersing the coating in various extreme environments such as 12M NaOH solution, aqua regia and 5% NaCl solution for a long time.

Figure 13:
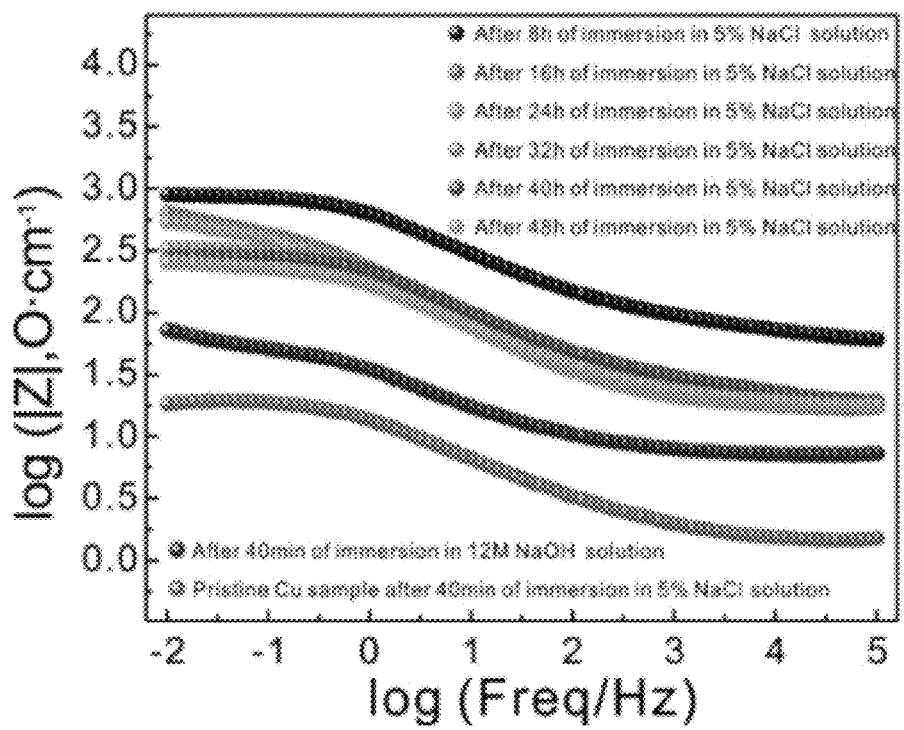
FIG. 13 is an impedance Bode diagram of different samples in a corrosion medium.

FIG. 13 shows an impedance Bode diagram of a metal sample coated with the superhydrophobic/superoleophobic coating with a thickness of 0.3 mm after the coated metal sample is immersed in 5% NaCl solution and 12M NaOH solution for a long time. First, in the present disclosure, the coated sample was immersed in 5% NaCl solution, and the electrochemical performance of the coating was tested every 8 h. It can be seen that the impedance modulus decreases gradually with the increase of the immersion time. Even so, it can still be compared that the impedance modulus of the coated metal sample after immersion for 48 h is still higher (much higher) than that of the pristine metal sample after immersion for 40 min, and a higher impedance modulus indicates better corrosion resistance. Moreover, for the samples coated with the coating in the whole frequency range, after immersion in the 12M NaOH solution for 40 min, their impedance amplitudes are all greater than that of the pristine sample immersed in the 5% NaCl solution for 40 min, which reflects that the coating has good corrosion resistance.

Figure 14:
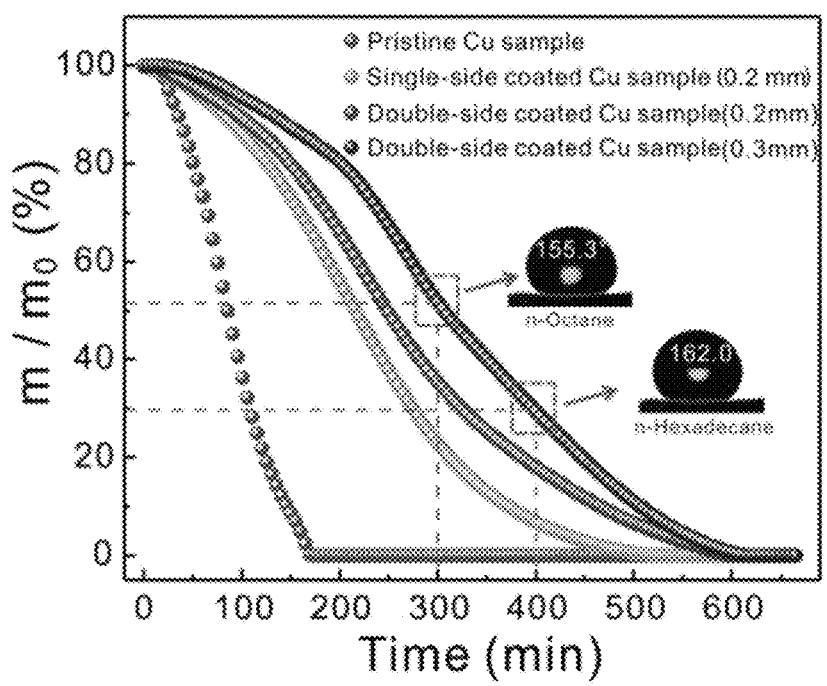
FIG. 14 shows a corrosion rate of a sample in aqua regia.

In addition, in the present disclosure, the corrosion rates of the pristine copper sheet and the coated copper sheet were also tested in the aqua regia, as shown in FIG. 14. Before immersion in the aqua regia, the mass of the copper sheet was m0. After immersion in the aqua regia, the real-time mass of the copper sheet was m. The mass was measured every 5 min. The corrosion resistance of the coated sample was represented by a mass change rate. It can be clearly seen that the mass loss rate of the pristine copper sheet is relatively large. Immersion in the aqua regia for 160 min may completely corrode 4.5 g of the copper sheet, while the slope of the corrosion curve of the coated sample obviously decreases. When only one side was coated (0.2 mm), the sample might be completely corroded after 480 min. When both sides were coated to 0.3 mm, the corrosion resistance rate of the sample was the best. Compared with the pristine sample, the corrosion time was prolonged by 281%. With the increase of the coating thickness, the falling off phenomenon of the sample in the early stage of immersion was also improved. It can be inferred that the coating of the present disclosure has a great application prospect in slowing down metal corrosion.

Figures 15A, 15B:
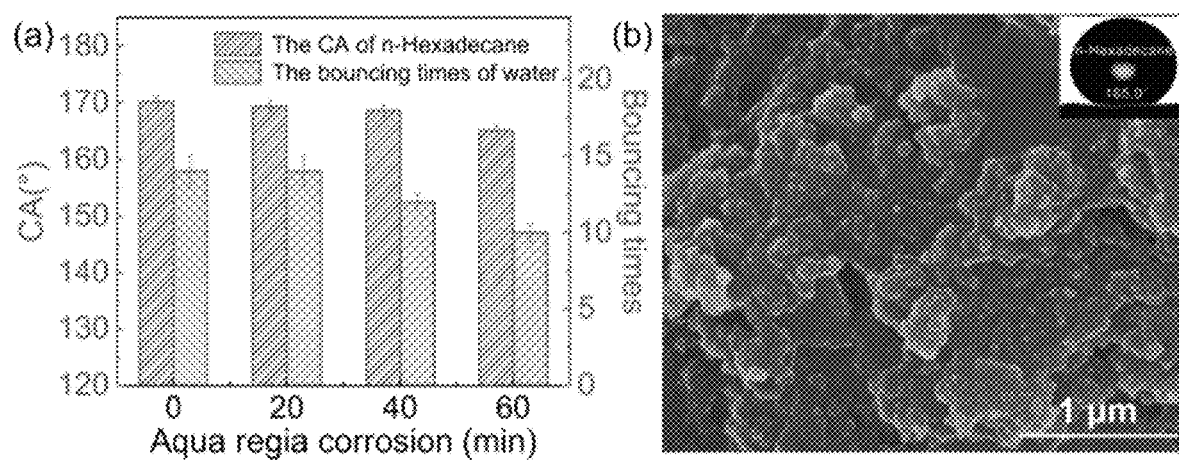
FIG. 15A shows changes in a contact angle of n-Hexadecane and bouncing times of water over immersion time when the n-Hexadecane is immersed in aqua regia.
FIG. 15B shows an SEM schematic diagram of a coating after the immersion in the aqua regia for 60 min.

What is more worth mentioning is that the coating can maintain stable performance in a harsh chemical environment, and also has good lyophobicity. The coating was immersed in the aqua regia for 20 min cyclically. The aqua regia resistance is represented by using the contact angle of the n-Hexadecane and the bouncing times of water. Test results are shown in FIG. 15(a) below. After immersion in the aqua regia for 60 min, the water can still bounce about 10 times on the surface of the coating. Through the SEM, it can be seen that the surface morphology of the coating (as shown in FIG. 15b) has not changed significantly.

Figure 16:
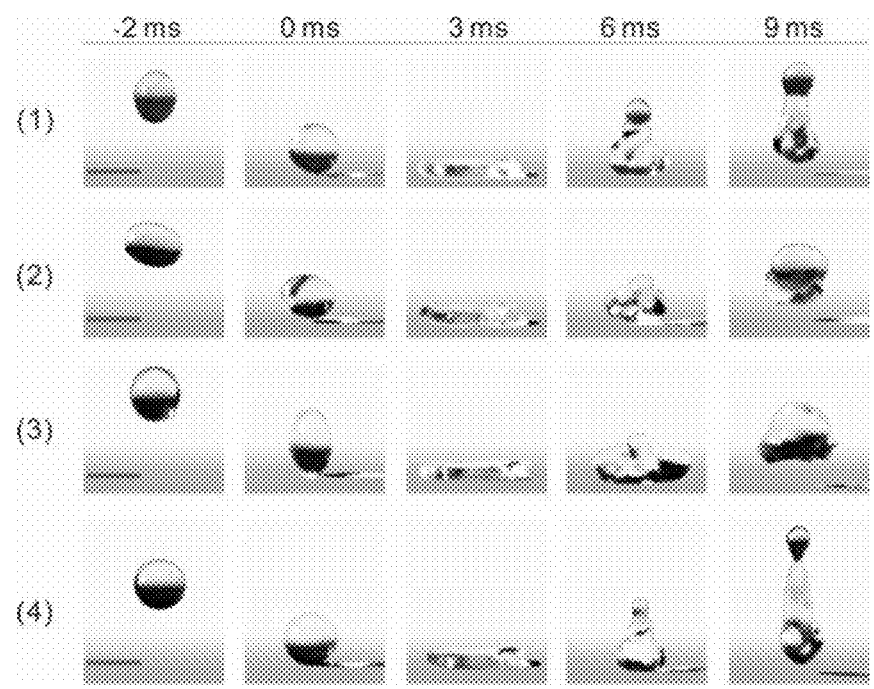
FIG. 16 shows that the sample can still make water bounce on the surface after being corroded under different conditions.

Although such extreme corrosion conditions are not common in practical applications, aqua regia is more convincing than 1M HCl. In addition to that the coating still has good chemical stability after being immersed in the aqua regia, the coating can also maintain good lyophobicity under three extreme environments: immersion in 5% NaCl solution for 48 h, immersion in 12M NaOH solution for 40 min and placement in a high-temperature environment at 240° ° C. for 24 h. As shown in FIG. 16, the water can still bounce on the surface of the coating after the coating is treated in the above harsh environment.

The above shows that the superhydrophobic/superoleophobic coating of the present disclosure plays a significant role in metal corrosion prevention, can effectively slow down metal corrosion, and has good chemical stability. That is, the coating can be applied in various harsh environments without damaging its properties, so it has the potential for large-scale application.

2.8 Research on the Flame Resistance and Thermal Insulation Performance of the Flame-Resistant Superhydrophobic/Superoleophobic Coating The flame resistance is one of the important functions of the coating design of the present disclosure. Since a flame retardant generally has extremely high polarity and hydrophilicity, the adding of a flame retardant often weakens the lyophobicity, which is overcome by using the polyfluorination policy and the reasonable proportioning of the DOPO and the micro nano particles in the present disclosure. The present disclosure researches the fireproof performance of the coating from three aspects: the flame resistance, the heat resistance and the smoke inhibition.

Figure 17:
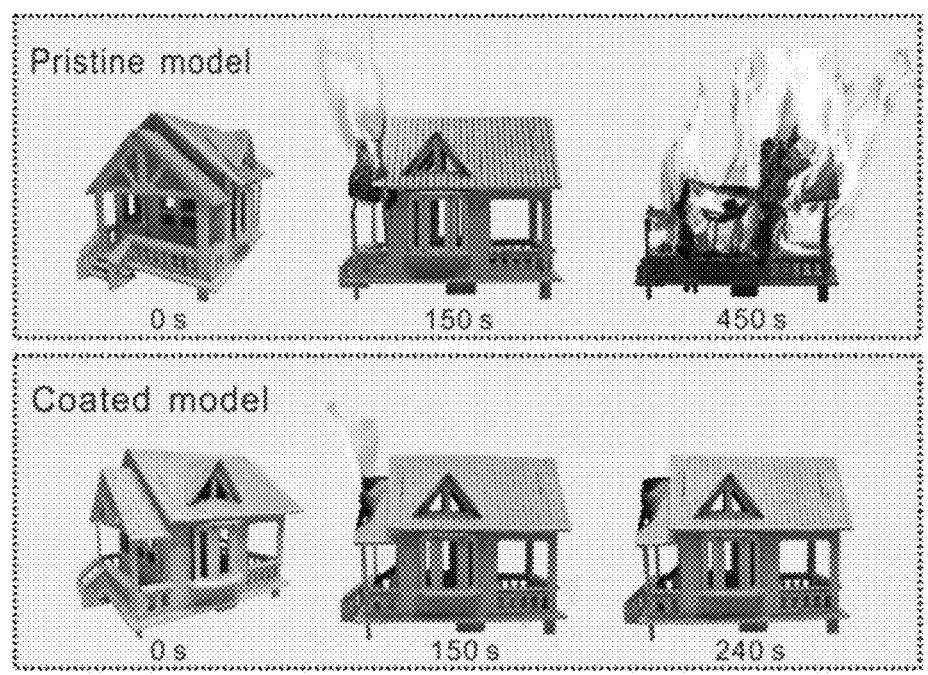
FIG. 17 shows a test on the flame resistance of the coating using a wooden house.

The flame resistance is first researched, which mainly aims at a wooden structure of a house. In the present disclosure, a wooden house model was used to research the flame resistance effect of the coating, as shown in FIG. 17. First, in the present disclosure, an alcohol blowtorch (with a flame temperature of 1000° C.) was used to ignite a pristine wooden house model. After 80 seconds, the ignition source was removed. After 150 s, obvious flame appeared on the wooden house. Over time, the fire gradually spread. After 450 s, the main body structure of the house had collapsed, and the house was mostly covered by the fire. It could be concluded that the pristine wooden house has no flame resistance. As a comparison, the wooden house model coated with the flame-resistant coating was ignited under the same conditions. At the 150th second, the wooden house only caught fire in the place which was ignited by the alcohol blowtorch, and the fire quickly self-extinguished. After 240 s, the main body structure of the house was basically unchanged and there was no flame. It could be generally seen from the experiment that the coating has the flame resistance. This may be because the DOPO will produce flame-resistant gas during decomposition, and at the same time, enough PO·active groups will be released from the gas phase. Furthermore, combustion factors will be captured during combustion, so as to interrupt the combustion chain reaction.

The second reason is heat resistance, which mainly aims at steel structure buildings. When an external temperature is up to 550° C., the yield strength of the steel structure is reduced to 40% of the normal temperature, and the whole structure is very easy to collapse, which is also a potential hazard in case of fire. Therefore, temperature changes of a steel structure coated with a fireproof coating in a high-temperature environment can directly reflect the thermal insulation effect of the flame-resistant coating, thereby evaluating the fire resistance of the coating.

Figure 18:
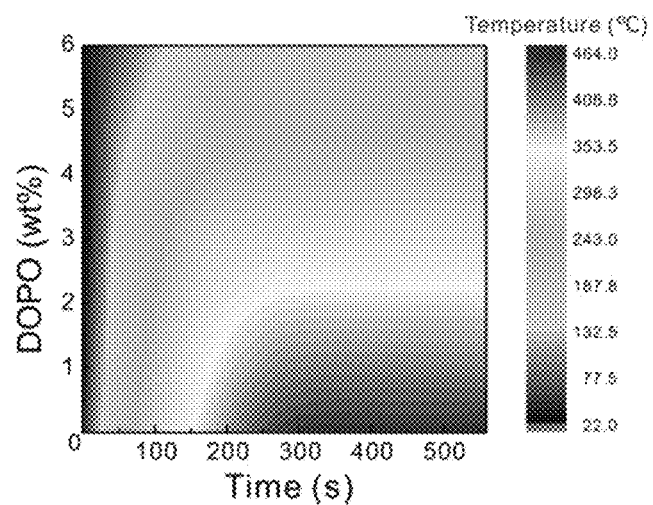
FIG. 18 shows a test on the temperature of a back surface of an iron sheet to research the impact of the coating on the thermal insulation performance of metal.

As shown in FIG. 18, after the sample was in contact with the flame, the temperature of the pristine iron sheet rises sharply and might reach 400° ° C. or above within 300 s. The slope of the rate curve was large, and a final stable temperature was as high as 464.0° C. It can be seen from the figure that with the increase of the content of the DOPO, the temperature rise rate of steel sheets gradually slows down. Furthermore, when the content of the DOPO is 6%, the maximum stable temperature is decreased by 60%, as low as 185° C. It can be seen that the flame-resistant coating is necessary and effective to fire prevention for steel structures.

Figure 19:
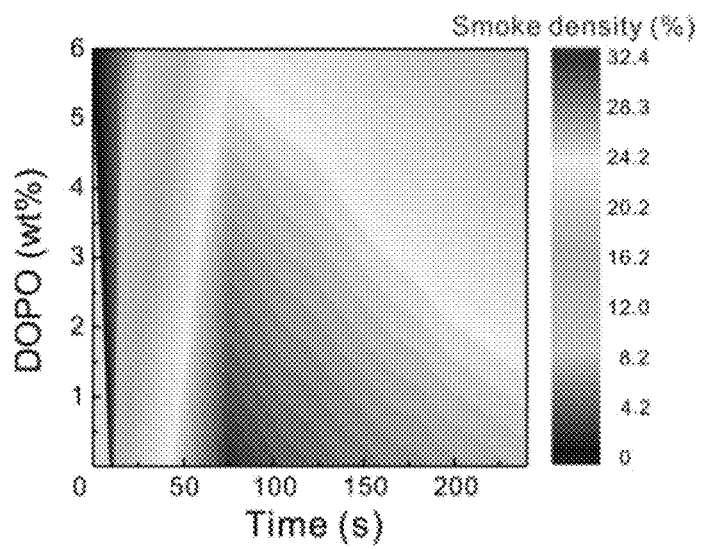
FIG. 19 shows a test on the smoke inhibition performance of the coating using a polystyrene board.

In the present disclosure, the smoke inhibition performance of the material was then tested. In case of a fire, the smoke inhibition performance of the material is important. Since the proportion of victims who died of smoke asphyxiation in a fire accident is far greater than a proportion of victims who died of high temperature burning. In the present disclosure, the smoke generation performance of a polystyrene board before and after modification through a smoke density test. As shown in FIG. 19, it can be seen that if no DOPO flame retardant is added, the polystyrene board burns rapidly, and the smoke density reaches a maximum value of 32.4% in about 90 s. As the DOPO is added, the smoke density gradually decreases. It can be seen from FIG. 19 that when the amount of the DOPO is 6%, a peak smoke density decreases significantly to 24.2%. Therefore, the flame-resistant coating can significantly improve the smoke inhibition performance of the material.

Next, in the present disclosure, the fire resistance of the coating was further analyzed by using a heat release rate (HRR), a peak heat release rate (pkHRR), a total heat release (THR), effective heat of combustion (EHC), a mass loss rate (MLR) and other data in the cone calorimeter.

Figure 20:
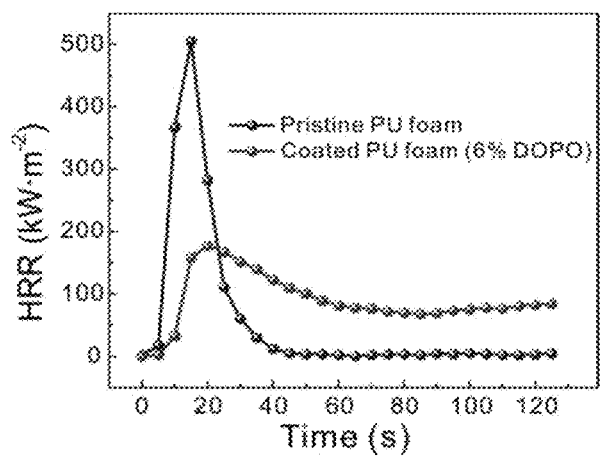
FIG. 20 shows an HRR test in a cone calorimeter test.

According to the HRR curve in FIG. 20, the HRR of the pristine PU foam rises sharply in only 17 s and reaches pkHRR (505.1 kW·m$^{-2}$). The introduction of the DOPO makes the HRR of the modified PU foam rise slowly, and the pkHRR is decreased by 65%, which is only 176.3 kW·m$^{-2}$. A large decrease of the pkHRR reduces the fire risk.

Figure 21:
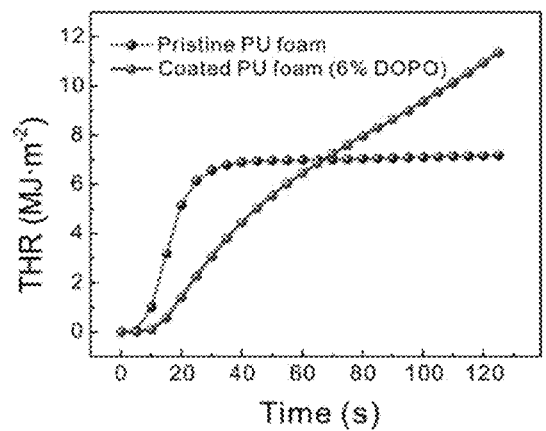
FIG. 21 shows a TRR test in the cone calorimeter test.

As shown in FIG. 21, the introduction of the flame retardant also has a certain impact on the value of the THR. It can be seen that the THR growth rate of the modified PU foam is much less than that of the pristine PU foam in the first 40 s. Although the THR of the modified PU foam rises slowly after 40 s, the THR growth rate is still relatively low and tends to be stable, which also has a certain inhibition effect on the fire to a certain extent. On the other hand, it can be seen from 3.20 and 3.21 that when the pristine PU foam is placed under a high heat flux, its HRR tends to zero and THR tends to be stable after 40 s, and the pristine PU foam almost burns completely, showing poor thermal stability. This indirectly reflects that according to the heat release, the modified PU foam has better thermal stability and flame resistance than the pristine PU foam.

Figure 22:
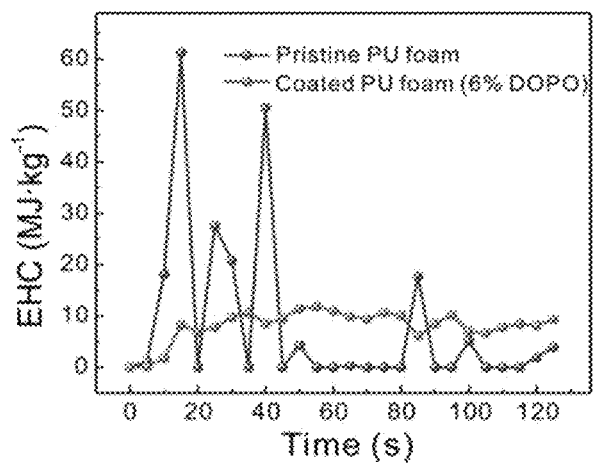
FIG. 22 shows an EHC test in the cone calorimeter test.

The EHC can be used to measure the combustion degree of a volatile object. As shown in FIG. 22, the peak value of the EHC of the pristine PU is 61.3 MJ·kg$^{-1}$, while the peak value of the EHC of the modified PU foam is 11.6 MJ·kg$^{-1}$, which decreases by about 80%.

Figure 23:
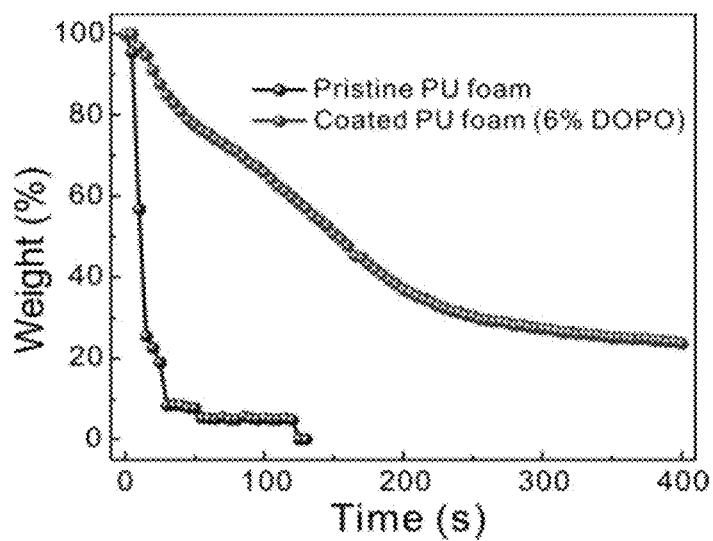
FIG. 23 shows a mass loss curve in the cone calorimeter test.

In FIG. 23 showing a mass loss curve, it can be seen that the quantity of char residues increases significantly, from 0.4% to 23.7%. It can be seen that only a small number of char residues are left after the pristine PU foam is combusted at a high temperature. Obviously, the pristine PU foam has no flame resistance. The quantity of char residues in the modified PU foam increases significantly, and a char layer formed effectively inhibits heat transfer and delays or even prevents combustion, showing excellent fire resistance.

Figure 24:
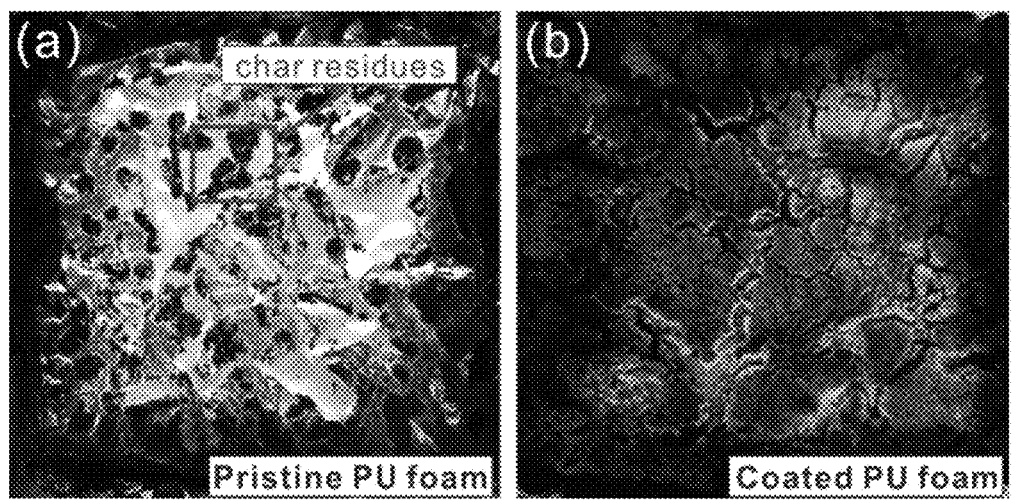
FIG. 24 shows a schematic diagram of char residues of a sample after the cone calorimeter test.

FIG. 24 shows a picture of real char residues after the cone calorimetry test. In addition, the mass loss rate is significantly reduced, which means that the supply of combustibles is reduced during the combustion of the modified PU, resulting in less heat radiation and less emission of harmful gases.

Figure 25:
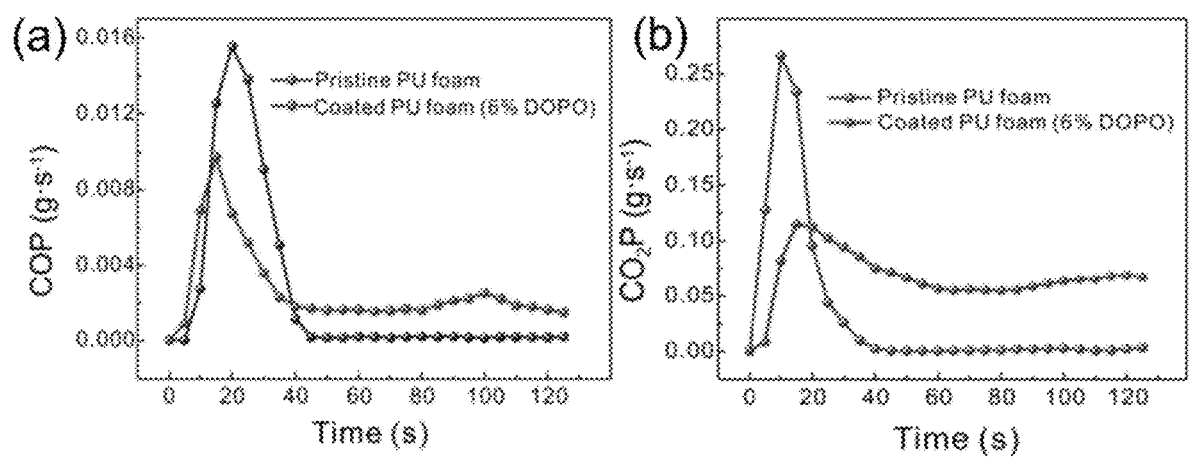
FIG. 25 shows emission of toxic gases from a sample in a burning process: (a) CO (b) $CO_2$.

In an actual fire, smoke usually causes more harm to people than high temperature. As shown in FIG. 25(a) and FIG. 25(b), the emission amounts of $CO_2$ and CO both increase first and then decrease. The emission amounts are the maximum in about 20 s. The peak emission amount of $CO_2$ is reduced by about 56.3%, and the peak emission amount of CO is reduced by about 37.5%, which can indicate that with the adding of the flame retardant, the emission of the harmful gases is well inhibited, so that the smoke risk in a fire is greatly reduced.

Figure 26:
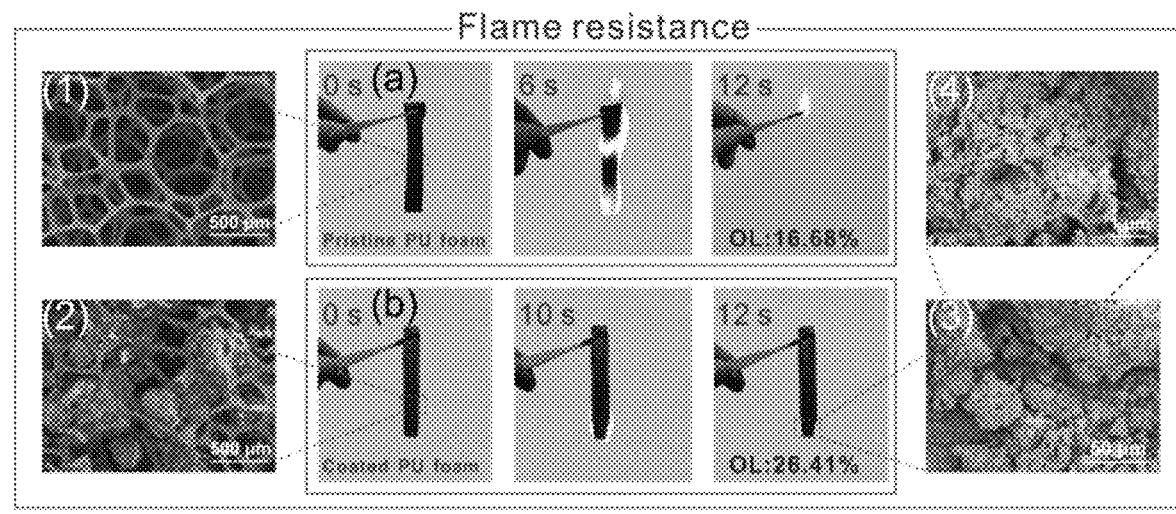
FIG. 26 shows an SEM schematic diagram of pristine PU foam in a vertical combustion test indicated with (b); an SEM schematic diagram of coated PU foam in the vertical combustion test indicated with (b); and (1)-(4) shows SEM schematic diagrams of a PU material at different stages.

In the present disclosure, an oxygen limit (OL) before and after the material modification was also researched. In FIG. 26(a), when the pristine PU foam was ignited, the flame was larger and larger, and there would be a molten drop phenomenon in the combustion process. After 12 s, the pristine PU completely burned, and the flame went out, with nearly no char residues. For the sample treated by the DOPO, in FIG. 26(b), the flame went out within 2 s, without a molten drop phenomenon, indicating that the sample has significant flame resistance. The illustrations are SEM images of the PU foam before and after modification and after ignition. 3.26.1 shows that PU has a unique reticular structure, in which a large internal space is exposed to air. The PU with the OL of 16.68% belongs to a highly combustible material. 3.26.2 shows that after the PU foam is modified with the DOPO, a certain amount of a flame-resistant substance is attached to the reticular structure, and OL is 26.41%. 3.26.3.4 shows the SEM images of the char residue after the sample is subjected to the ignition test. It can be clearly seen that the surface of the char residue is relatively rough. After the image is enlarged, it can be seen that there are many dense pores on the surface of the sample, and the porous structure can also absorb the released heat.

It can be seen from the above data that after the coating of the present disclosure is modified, the flame resistance of these materials is significantly improved. This is mainly because the phosphoric acid-containing condensed phase formed by the thermal decomposition of the flame retardant DOPO has a good catalytic charring effect, and a formed porous carbon layer has a good heat insulation and oxygen isolation effect, which can effectively block the heat transfer and inhibit the combustible oxygen, thus achieving a good flame resistance effect. The porous carbon layer has an obvious inhibition effect on the escape of toxic gases. In the present disclosure, a flame retardant is directly added to the system through mechanical blending to achieve reaction conditions required for an expected flame resistance level. This method is much simpler than using other flame retardants to achieve the reaction conditions, such as high-temperature heating, of the same flame resistance level, so that the coating of the present disclosure is more likely to be industrially produced in a large scale.

Embodiment 2

Preparation of a Bilayer Superhydrophobic Suspension (Top Layer)

15 nm $SiO_2$ (0.45 g), 50 nm $SiO_2$ (0.45 g) and 25 μm α-cellulose (0.45 g) were dispersed in a mixed solution containing anhydrous ethanol (30 mL) and ammonia (10 mL) by means of stirring, and ultrasonic treatment was performed in a water bath at 60° C. for 30 min. TEOS (3 mL) and FAS (0.9 mL) were dropwise added to the above solution and were continuously stirred for 4 h to obtain solution A. Bisphenol A epoxy resin EP (5.0 g) was dissolved in an anhydrous ethanol solution (25 mL) for 1 h by ultrasonic oscillation to obtain solution B. Solution B was added into solution A in the water bath at 60° C. for 1 h. After full dissolution, 0.6 mL of TEOS and 0.6 mL of FAS were dropwise added into the above mixed solution and stirred for 1 h to obtain solution C. At the same time, in another flask, 2.8 mL of AS was added into 10 mL of absolute ethanol at 60° C., and 0.3 mL of FAS was dropwise added for reaction for 1 h to obtain a curing agent. Finally, after the reaction lasted for 15 min, the curing agent was added into solution C to obtain a final homogeneous solution, which was a top-layer suspension.

Preparation of a Bilayer Superhydrophobic Suspension (Bottom Layer)

EP (2.0 g) was dissolved in an anhydrous ethanol solution (10 mL) for 1 h by ultrasonic vibration. 0.8 mL of a curing agent and 2 g of a DOPO flame retardant were added for reaction in a water bath at 60° ° C. for 15 min to obtain a bottom-layer spraying solution.

Preparation of a Bilayer Superhydrophobic Coating (BLC)

A spray gun was used to spray 3 mL of the bottom-layer solution onto a surface of a horizontally placed glass slide, aluminum plate, stainless steel plate and the like from a distance of 15 cm in a vertical direction, and then to spray 3 mL of the top-layer solution onto the surface of the sample. Finally, the sample was dried in an oven at 120° C. for 6 h to obtain a bilayer abrasion-resistant and flame-resistant superhydrophobic coating.

Taber Abrasion Test on the Material

Figure 27:
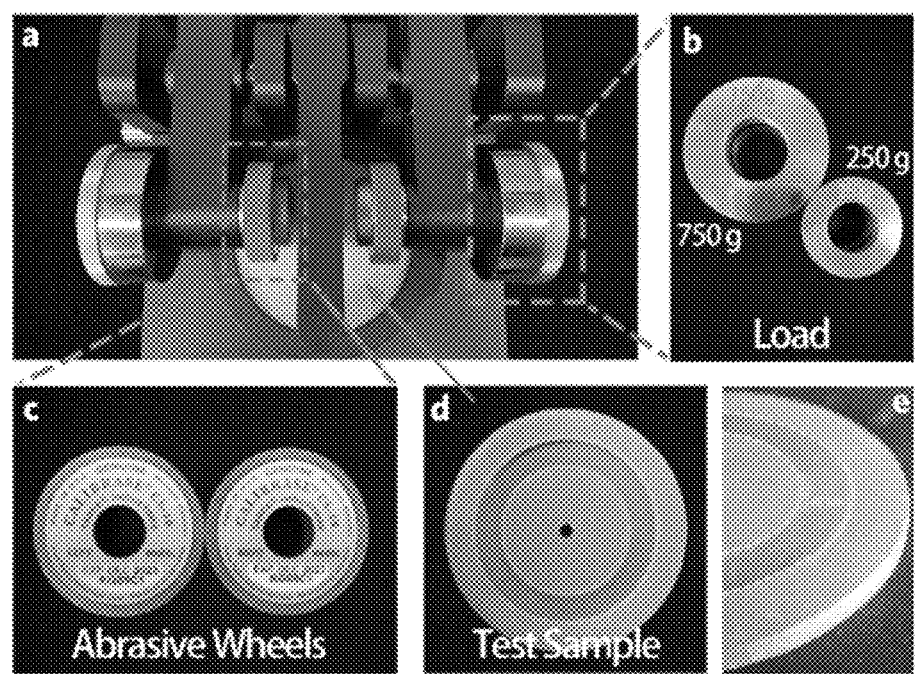
FIG. 27 is a supplementation of the schematic diagram of a mechanical abrasion test. (a) Taber abrasion testing machine. (b) Abrasion load. The loads are 750 g and 250 g respectively. (c) Abrasive wheel. (d) Test samples. (e) After the test, the sample thickness decreases by about 40 μm.

A Taber abrasion testing machine was used to carry out a coating abrasion resistance test according to the standard ASTM-D4060. The Taber abrasion testing machine adopted two abrasive wheels (CALIBRATE®Cs-10 from TABER® Industries) and tested a sample having a diameter of 10 cm and fixed on a rotating platform under different loads. Two different loads, i.e. 250 g and 750 g (the schematic diagram is shown in FIG. 27 below), were used. According to ASTM D4060, one rotation of a sample was regarded as a cycle, and the rotating speed of the rotating platform was 79 rpm/min. After 3000 cycles of abrasion tests were carried out on a TLC sample at 250 g, the superhydrophobic coating could still maintain the superhydrophobicity. After 10000 cycles of abrasion tests, the contact angle of water could still reach 127.8°. The superhydrophobic coating could still maintain the superhydrophobicity (the contact angle was about 150.9°, and the sliding angle was about 6.1°) even after 1000 cycles of abrasion tests at 750 g (unprecedented weight that had never been used).

Test on the Adhesion of the Material

Figure 28:
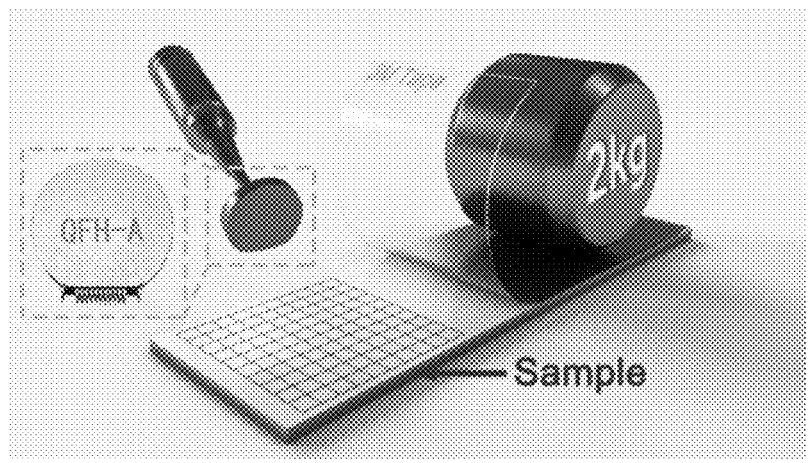
FIG. 28 is a schematic diagram of an adhesion test of a TLC.

An adhesion of the superhydrophobic coating was tested according to ASTM D3359. Three adhesion tests were carried out on the sample: (1) A glass sheet coated with the superhydrophobic coating was cooked in boiled water for 20 min. (2) The glass sheet coated with the superhydrophobic coating was cooked in normal-temperature water for 24 h. (3) All the samples were cut crosswise with a QHF cutter (at a clearance of 1 mm) (as shown in FIG. 28).

A clearance between blades of the QHF cutter was 1 mm, so an area of each grid obtained by cutting was about 1 mm. A center of a 3M tape was put at an intersection of cuts. The tape was flattened at the cuts with fingers and was rolled back and forth with a load of 2 kg to fully bond the tape to the test sample. Color changes of the transparent tape could represent whether the tape was in good contact with the sample. Within 90 s, one end of the tape was grasped and pulled apart as quickly as possible at an angle of 180°, thus removing the tape. The falling off from the surface of the coating was observed to evaluate an adhesion level (as shown in FIG. 29 below), so as to evaluate the adhesion of the coating.

Because of the introduction of the micro/nano particles, the traditional superhydrophobic coating had poor mechanical stability and low binding force to the substrate. The main reason was that the coating was obtained by spraying and curing the suspension, in which, the micro/nano particles were randomly distributed. After spraying, some micro/nano particles would be in direct contact with the substrate. Since these particles had no adhesion to the substrate, this would affect the overall mechanical stability of the coating to a certain extent. In order to solve this problem, the present disclosure adopts step-by-step spraying and curing policies. The BLC adopts the same preparation process for a bottom layer. Pure epoxy resin is not added with any micro/nano particles and cellulose to be used as a bottom layer, and has extremely high bonding strength for connection with the substrate. The introduction of a phosphorus-containing polar flame retardant (DOPO) to the bottom layer not only avoids adverse effects on the superhydrophobic performance, but also makes the coating have flame resistance. In comparison with a TLC coating, in the BLC system, after high-concentration epoxy resin dispersion liquid is sprayed as the bottom layer, the top-layer coating can be continued to be sprayed without any curing process.

In the overall structure, the epoxy resin is used as a binder to present a gradient concentration distribution on the entire coating. As thermosetting resin, the epoxy resin can be cured and crosslinked to form a network structure. In the curing process, a large number of chemical bonds are formed between the epoxy resin network structure and the substrate, so that the adhesion is extremely high.

The mechanical stability of the superhydrophobic coating is a great challenge. The present disclosure greatly improves the mechanical properties of the BLC by means of embedding the cellulose and a silicon dioxide skeleton into the epoxy resin by adopting a preparation process for a multi-layer structure. According to the American Society for Testing Materials (ASTM) standard, the mechanical properties of the coating ARE characterized by the Taber abrasion testing machine. The BLC can withstand 1000 cycles at 250 g.

Test on the Adhesion of the Superhydrophobic Coating

Figure 30:
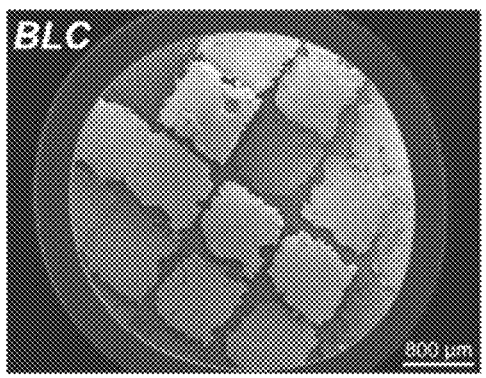
FIG. 30 shows an SEM image of the coating after rapid stripping of a 3M tape.

The perfect adhesion between the coating and the substrate is mainly attributed to a bottom-layer structure with epoxy resin serving as a main component. The test on the adhesion was based on ASTM D3359. The surface of the coating was cross cut with the QFH to obtain 100 grids with a uniform size. After the 3M tape was quickly stripped, a damage state of the coating was observed (as shown in FIG. 30). It can be seen that the BLC can conform to ASTM 1B.

What is claimed is:

1. A preparation method for a superhydrophobic/superoleophobic flame-resistant and abrasion-resistant coating material, comprising:
   spraying a superhydrophobic/superoleophobic suspension onto a surface of a horizontally placed substrate with a spray gun at a distance of 15 cm in a vertical direction, and then drying the surface in an oven at 120° C. for 6 h; and finally obtaining the superhydrophobic/superoleophobic flame-resistant and abrasion-resistant coating material, wherein
   a preparation method for the superhydrophobic/superoleophobic suspension comprises the following steps:
   S1, dispersing 15 nm $SiO_2$, 50 nm $SiO_2$ and 25 μm α-cellulose in a mixed solution containing anhydrous ethanol and ammonia, and performing ultrasonic treatment for 30 min;
   S2, dropwise adding tetraethyl orthosilicate and perfluorooctane trimethoxy silane to the solution formed in step S1, and stirring the same for 6 h in a water bath at 60° C. to obtain solution A;
   S3, dissolving bisphenol A epoxy resin in the anhydrous ethanol solution, and performing ultrasonic oscillation for 30 min to obtain solution B;
   S4, adding solution B to solution A in the water bath at 60° C.; after full mixing, quickly injecting the tetraethyl orthosilicate and the perfluorooctane trimethoxy silane into the suspension; and stirring the same at 60° C. for 2 h to obtain solution C, a volume ratio of solution B to solution A being solution A:solution B=8:1;
   S5, adding a fluorine-containing curing agent into anhydrous ethanol, and dissolving the fluorine-containing curing agent with ultrasonic waves to obtain solution D; and
   S6, adding solution D into solution C, and stirring the same for 20 min; and after full mixing, adding a flame retardant, and stirring the same to obtain a final uniform solution, a volume ratio of solution D to solution C being solution C:solution D=48:5, and the flame retardant being 9,10-dihydro-9-oxa-10-phospho-phenanthrene-10-oxide (DOOP);
   a preparation method for the fluorine-containing curing agent comprises the following steps:
   1) Respectively dissolving heptafluorobutyric acid and 3-(2-aminoethylamino) propyltrimethoxysilane in deionized water;
   2) Dropwise adding the heptafluorobutyric acid solution to the 3-(2-aminoethylamino) propyltrimethoxysilane solution; and
   3) after the dropwise adding is completed, heating the solution to obtain light yellow colloid which is a fluorine-containing curing agent.

2. The preparation method for the superhydrophobic/superoleophobic flame-resistant and abrasion-resistant coating material according to claim 1, wherein the substrate is glass, PU foam or a PVC film.

3. The preparation method for the superhydrophobic/ superoleophobic flame-resistant and abrasion-resistant coating material according to claim 1, wherein in step 3), the reaction was performed by heating at 100° C.

4. The preparation method for the superhydrophobic/ superoleophobic flame-resistant and abrasion-resistant coating material according to claim 1, wherein in step S1, in the mixed solution of absolute ethanol and ammonia water, a volume ratio of the absolute ethanol to the ammonia water is (1-5):1.

5. The preparation method for the superhydrophobic/ superoleophobic flame-resistant and abrasion-resistant coating material according to claim 4, wherein in step S1, the volume ratio of the anhydrous ethanol to the ammonia water is 3:1.

6. The preparation method for the superhydrophobic/ superoleophobic flame-resistant and abrasion-resistant coating material according to claim 1, wherein in step S1, a mass ratio of the 15 nm $SiO_2$, 50 nm $SiO_2$ and 25 μm α-cellulose is 1:1:2.

7. The preparation method for the superhydrophobic/ superoleophobic flame-resistant and abrasion-resistant coating material according to claim 1, wherein in step S2, a volume ratio of the tetraethyl orthosilicate to the perfluorooctane trimethoxy silane is 2:1.

8. The preparation method for a superhydrophobic/superoleophobic flame-resistant and abrasion-resistant coating material according to claim 1, wherein in step S4, a volume ratio of the tetraethyl orthosilicate to the perfluorooctane trimethoxy silane is 1:1.

9. The preparation method for the superhydrophobic/ superoleophobic flame-resistant and abrasion-resistant coating material according to claim 1, wherein in step S6, the amount of the DOPO is 1-6% of the total mass of the raw materials.

10. The preparation method for the superhydrophobic/ superoleophobic flame-resistant and abrasion-resistant coating material according to claim 1, wherein the amount of 15 nm $SiO_2$ is 25% of the total mass of the 15 nm $SiO_2$, the 50 nm $SiO_2$ and the 25 μm α-cellulose, and the content of the DOPO is 6%.

11. The preparation method for the superhydrophobic/ superoleophobic flame-resistant and abrasion-resistant coating material according to claim 1, wherein a mass ratio of the bisphenol A epoxy resin to the fluorine-containing curing agent is 1:1.066.

\* \* \* \* \*